United States Patent
Akuzawa et al.

(10) Patent No.: US 10,361,592 B2
(45) Date of Patent: Jul. 23, 2019

(54) POWER TRANSMISSION DEVICE AND ANTENNA

(71) Applicant: Mitsubishi Electric Engineering Company, Limited, Chiyoda-ku (JP)

(72) Inventors: Yoshiyuki Akuzawa, Chiyoda-ku (JP); Yuki Ito, Chiyoda-ku (JP)

(73) Assignee: Mitsubishi Electric Engineering Company, Limited, Chiyoda-ku (JP)

( * ) Notice: Subject to any disclaimer, the term of this patent is extended or adjusted under 35 U.S.C. 154(b) by 0 days.

(21) Appl. No.: 15/743,886

(22) PCT Filed: Aug. 3, 2015

(86) PCT No.: PCT/JP2015/071961
§ 371 (c)(1),
(2) Date: Jan. 11, 2018

(87) PCT Pub. No.: WO2017/022054
PCT Pub. Date: Feb. 9, 2017

(65) Prior Publication Data
US 2018/0205264 A1 Jul. 19, 2018

(51) Int. Cl.
*H02J 50/12* (2016.01)
*B60L 9/00* (2019.01)
*H01Q 1/24* (2006.01)
*H01Q 7/06* (2006.01)

(52) U.S. Cl.
CPC .............. *H02J 50/12* (2016.02); *B60L 9/00* (2013.01); *H01Q 1/248* (2013.01); *H01Q 7/06* (2013.01)

(58) Field of Classification Search
CPC ........................................... H02J 50/12
See application file for complete search history.

(56) References Cited

U.S. PATENT DOCUMENTS

| | | | |
|---|---|---|---|
| 9,419,468 B1 * | 8/2016 | Pierson | H02J 7/025 |
| 2010/0225271 A1 | 9/2010 | Oyobe et al. | |
| 2010/0230501 A1 | 9/2010 | Fukushima et al. | |
| 2012/0169278 A1 | 7/2012 | Choi et al. | |
| 2012/0242447 A1 | 9/2012 | Ichikawa | |

(Continued)

FOREIGN PATENT DOCUMENTS

| | | |
|---|---|---|
| JP | 2006-042519 A | 2/2006 |
| JP | 2009-106136 A | 5/2009 |

(Continued)

OTHER PUBLICATIONS

English Translation of the Written Opinion of the International Search Authority, dated Feb. 6, 2018 in PCT/JP2015/071961, filed on Aug. 3, 2015.*

(Continued)

*Primary Examiner* — Daniel J Cavallari
(74) *Attorney, Agent, or Firm* — Oblon, McClelland, Maier & Neustadt, L.L.P.

(57) ABSTRACT

A transmission/reception unit including a transmitting antenna and a receiving antenna for carrying out a wireless power transmission in cooperation with the transmitting antenna. Each of the transmitting antenna and the receiving antenna includes a coil which has a shape in which a portion through which a current flows in a direction extends along another portion through which a current flows in an opposite direction.

15 Claims, 24 Drawing Sheets

(56) References Cited

U.S. PATENT DOCUMENTS

| | | |
|---|---|---|
| 2013/0234509 A1 | 9/2013 | Ichikawa et al. |
| 2015/0244181 A1 | 8/2015 | Kagami et al. |
| 2015/0280446 A1 | 10/2015 | Akuzawa et al. |
| 2015/0280447 A1 | 10/2015 | Akuzawa et al. |

FOREIGN PATENT DOCUMENTS

| | | | |
|---|---|---|---|
| JP | 2009-147560 A | 7/2009 | |
| JP | 2011/074091 A1 | 6/2011 | |
| JP | 2012-109449 A | 6/2012 | |
| JP | 2013-038893 A | 2/2013 | |
| JP | 2014-090648 A | 5/2014 | |
| JP | 2014-090652 A | 5/2014 | |
| WO | WO 2014/069581 A1 | 5/2014 | |
| WO | WO-2015108152 A1 * | 7/2015 | ............. G01L 3/108 |

OTHER PUBLICATIONS

International Search Report dated Oct. 20, 2015 in PCT/JP2015/071961, filed on Aug. 3, 2015.
Office Action dated Apr. 5. 2016 in Japanese Patent Application No. 2016-506704 (with machine translation thereof).
Office Action dated Aug. 23, 2016 in Japanese Patent Application No. 2016-506704 (with machine translation thereof).
Extended European Search Report dated Feb. 28, 2019 in European Patent Application No. 15900367.2, citing documents AA and AO therein, 7 pages.

* cited by examiner

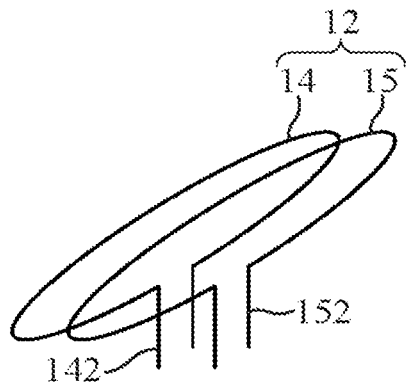
FIG. 3A  FIG. 3B
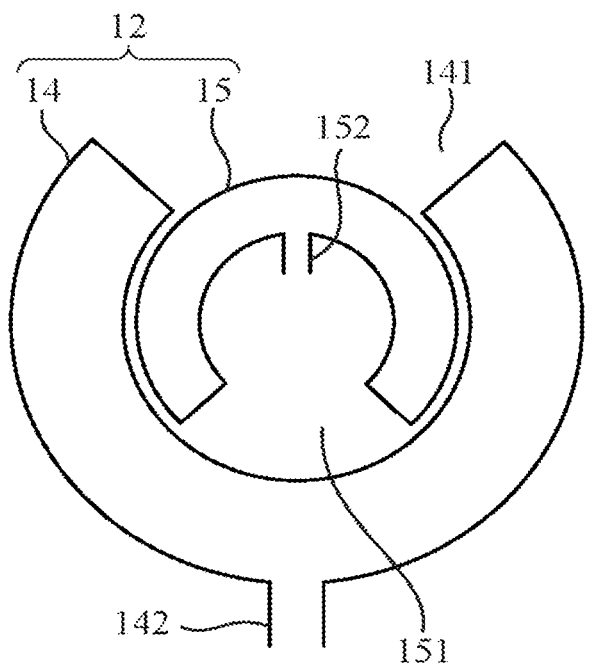
FIG. 4

FIG. 21
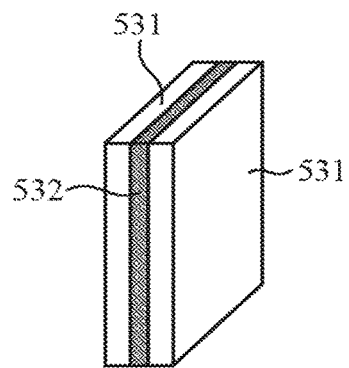
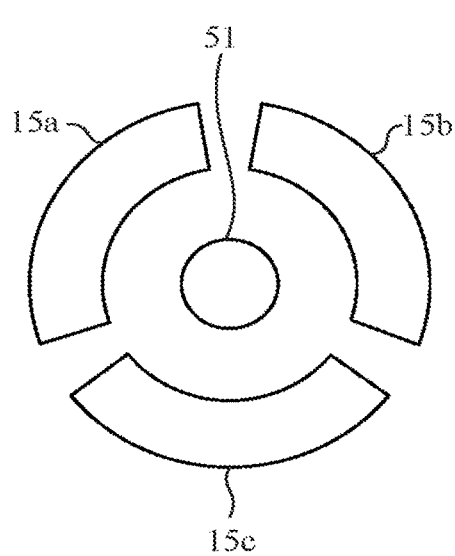
FIG. 22A
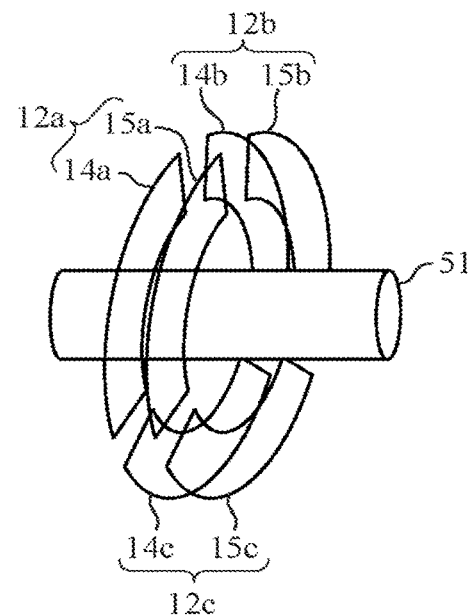
FIG. 22B

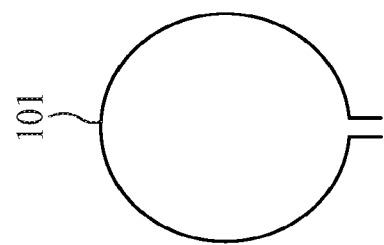
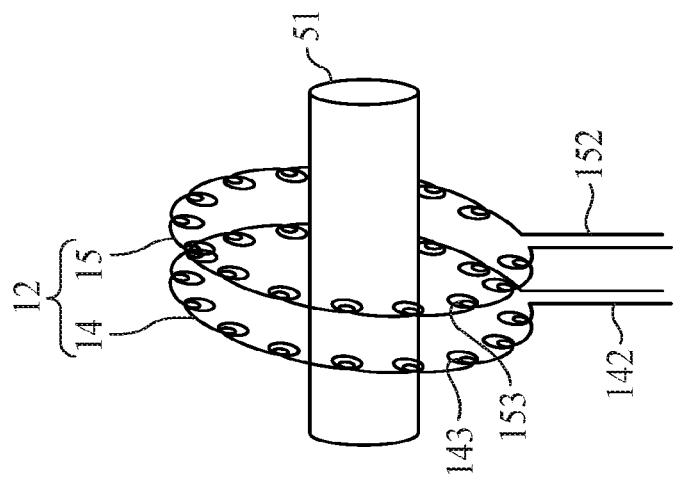
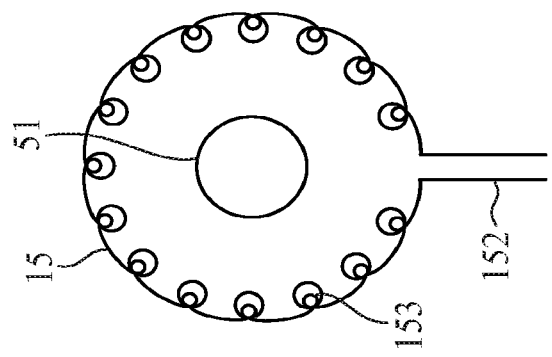
FIG. 25C (Prior Art)
FIG. 25B
FIG. 25A

POWER TRANSMISSION DEVICE AND ANTENNA

TECHNICAL FIELD

The present invention relates to a power transmission device and antenna for carrying out a wireless power transmission.

BACKGROUND ART

Devices for wireless power transmissions via rotatable bodies are conventionally known (for example, refer to Patent Literature 1). In a conventional structure disclosed by this Patent Literature 1, a transmission/reception unit (a transmitting antenna and a receiving antenna) is disposed with the central axis of a rotatable body (a shaft) being approximately centered in the transmission/reception unit, or is disposed around the central axis, and electric power is transmitted from the transmitting antenna to the receiving antenna by magnetic field coupling. Further, by disposing plural transmission/reception units, multiple power transmissions can be carried out.

CITATION LIST

Patent Literature

Patent Literature 1: Japanese Patent Application Publication No. 2014-90648.

SUMMARY OF INVENTION

Technical Problem

However, in the conventional structure disclosed by Patent Literature 1, it is not considered that the shaft is a metallic member. Therefore, the problem is that in a case in which the shaft is a metallic member, it becomes difficult for a power transmission to be carried out under the influence of this shaft. More specifically, the power transmission is influenced by a flow of an eddy current through the shaft due to a magnetic field from the transmission/reception unit, so that an eddy current loss or the like occurs. Further, the same goes for a case in which a metallic member is included in a housing in which the transmission/reception unit is contained.

Therefore, the problem with the conventional device is that space between the transmission/reception unit and the above-mentioned metallic member is necessarily provided, thus causing the size of the device to be increased.

The present invention is made in order to solve the above-mentioned problem, and it is therefore an object of the present invention to provide a power transmission device and antennas which are capable of carrying out power transmissions even in a case in which a metallic member exists in the surroundings.

Solution to Problem

According to the present invention, there is provided a power transmission device which includes one or more transmission/reception units each of which includes a transmitting antenna and a receiving antenna for carrying out a wireless power transmission in cooperation with the transmitting antenna. Each of the transmitting and receiving antennas includes a coil having a shape in which a portion through which a current flows in a direction extends along another portion through which a current flows in an opposite direction.

Advantageous Effects of Invention

According to the present invention, by the above described structure, a power transmission can be implemented even in a case in which a metallic member exists in the surroundings.

BRIEF DESCRIPTION OF DRAWINGS

FIG. 2A is a front view, FIG. 2B is a perspective view, and FIG. 2C is a front view showing a conventional antenna shape;

FIGS. 3A and 3B are schematic views for explaining the principle of operation of the transmission/reception unit of Embodiment 1 of the present invention, FIG. 3A is a front view, and FIG. 3B is a perspective view;

FIG. 4 is a schematic view showing another exemplary structure of the transmission/reception unit in Embodiment 1 of the present invention;

FIG. 8A is a side view, and FIG. 8B is a front view;

FIGS. 13A and 132B are schematic views showing an exemplary application of the power transmission device according to Embodiment 1 of the present invention (power supply to a steering of a steering wheel), FIG. 13A is a front view.

FIG. 14A is a side view, and FIG. 14B is a front view;

FIG. 15A is a view showing a case in which a housing is made from metal, and FIG. 15B is a view showing a case in which a housing and a shaft are made from metal;

FIG. 21 is a schematic view showing another exemplary the structure of a shielding member in Embodiment 3 of the present invention;

FIGS. 22A and 22B are schematic views showing an exemplary structure of a transmission/reception unit of Embodiment 4 of the present invention, FIG. 22A is a front view, and FIG. 22B is a perspective view;

FIG. 23A is a front view, and FIG. 23B is a perspective view;

FIGS. 25A to 25C are schematic views showing exemplary structures of a transmission/reception unit in connection with Embodiment 5 of the present invention, FIG. 25A is a front view, FIG. 25B is a perspective view, and FIG. 25C is a front view showing a conventional antenna shape;

FIG. 26A is a front view, and FIG. 26B is a perspective view;

FIG. 28A shows a case in which a housing is made from a metallic material, and FIG. 28B shows a case in which a housing and a shaft are made from metallic materials;

FIG. 29A is a front view, and FIG. 29B is a perspective view;

FIG. 30A is a front view, and FIG. 30B is a perspective view;

FIG. 31A is a front view, and FIG. 31B is a perspective view.

DESCRIPTION OF EMBODIMENTS

Hereafter, embodiments of the present invention will be explained in detail with reference to the drawings.

Embodiment 1

Figure 1:
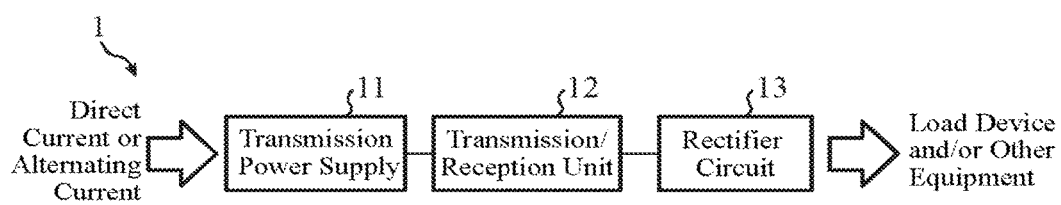
FIG. 1 is a block diagram showing an exemplary structure of a power transmission device according to Embodiment 1 of the present invention.

FIG. 1 is a block diagram showing an exemplary structure of a power transmission device 1 according to Embodiment 1 of the present invention.

The power transmission device 1 transmits electric power including an electric signal in a wireless manner. This power transmission device 1 includes a transmission power supply 11, a transmission/reception unit 12, and a rectifier circuit 13, as shown in FIG. 1. Further, the transmission/reception unit 12 has a transmitting antenna 14 and a receiving antenna 15, as shown in FIG. 2B and so on.

The transmission power supply 11 supplies either direct current power or alternating current power which is inputted thereto to the transmitting antenna 14. In a case in which a power supply for high frequency is used as the transmission power supply 11, the transmission power supply 11 converts either the direct current power or the alternating current power which is inputted thereto into high-frequency power, and supplies the high-frequency power to the transmitting antenna 14.

The transmitting antenna 14 transmits the power supplied from the transmission power supply 11 in a wireless manner.

The receiving antenna 15 receives the power transmitted, in a wireless manner, from the transmitting antenna 14.

The rectifier circuit 13 converts the power received by the receiving antenna 15 into direct current power. The direct current power after conversion by this rectifier circuit 13 is outputted to a load device and/or other equipment (not illustrated).

The transmission/reception unit 12 carries out a power transmission by using magnetic-field resonance, electric-field resonance, or electromagnetic induction.

Next, an exemplary structure of the transmitting and receiving antennas 14 and 15 will be explained with reference to FIGS. 2A to 2C. FIGS. 2A and 2B show a case in which the transmitting and receiving antennas 14 and 15 are arranged opposite to each other along the direction of a central axis.

As shown in FIG. 2A and each of the transmitting and receiving antennas 14 and 15 includes a coil which has a shape in which a portion through which a current flows in a direction extends along another portion through which current flows in an opposite direction. Further, in the structure shown in FIGS. 2A and 2B, loop surfaces of the transmitting and receiving antennas 14 and 15 are formed by circular arcs, and the coils are wound indirectly around a shaft 51 which is a metallic member. More specifically, each of the transmitting and receiving antennas 14 and 15 which are shown in FIGS. 2A and 2B is formed so as to have a shape which is acquired by downwardly denting an upper portion of a conventional antenna 101 shown in FIG. 2C.

Although in the figures a case in which the shaft 51 is a structural rotatable body and the transmitting and receiving antennas 14 and 15 can rotate independently is shown, the shaft 51 can be a non-rotatable body. Further, although in the figures, only one turn in each of the transmitting and receiving antennas 14 and 15 is shown, plural turns are typically wound in a spiral or helical form in each of the transmitting and receiving antennas. Further, lead portions 142 and 152 of the transmitting and receiving antennas 14 and 15, the lead portions being connected to feed terminals, are not limited to ones disposed at positions shown in the figures, and can be disposed at arbitrary positions.

By forming the transmitting and receiving antennas 14 and 15 in such a way that the transmitting and receiving antennas have a shape as shown in FIGS. 2A and 2B, the shaft 51 is located outside their loop surfaces. Therefore, the interlinkage of a magnetic flux between the transmitting and receiving antennas 14 and 15 is not prevented.

Further, in this antenna shape, as shown in FIGS. 3A and 3B, the directions of currents (arrows shown in FIG. 3A) flowing through two lines arranged close to each other are different from each other by 180 degrees. Therefore, in a narrow area inside each loop surface, the magnetic flux direction becomes uniform and the magnetic flux becomes dense. By using this magnetic field having a high magnetic flux density, the transmission of power from the transmitting antenna 14 to the receiving antenna 15 is carried out. In contrast, because the magnetic flux cancels out outside the loop surfaces, no magnetic field having a high magnetic flux density spreads out over the surroundings of the antennas, while only a magnetic field having a low magnetic flux density reaches the metallic member (the shaft 51) existing in the surroundings of the antennas. Therefore, the influence (an eddy current loss and so on) of this shaft 51 can be reduced, and a power transmission with high energy efficiency can be implemented.

From the above, even if the shaft 51 is a metallic member, the transmission of power between the transmitting and receiving antennas 14 and 15 can be carried out.

Gaps 141 and 151 between both ends of the loop surfaces shown in FIGS. 2A and 2B can be set arbitrarily. Further, the power transmission efficiency becomes high with increase in the degree of overlap between the opposite surfaces of the transmitting and receiving antennas 14 and 15.

Further, in a case in which the shaft 51 is a rotatable body and a power source line is connected to a load device and other equipment via this rotatable body, the transmitting and receiving antennas 14 and 15 rotate independently. Therefore, the gaps 141 and 151 are set in such a way that at least parts of the transmitting and receiving antennas 14 and 15 are opposite to each other even if the transmitting and receiving antennas 14 and 15 are placed in any rotatable state.

FIGS. 2A and 2B show the example in which the transmitting and receiving antennas 14 and 15 are arranged opposite to each other along the direction of the central axis is shown. Nonetheless, the present embodiment is not limited to this example. For example, as shown in FIG. 4, the transmitting and receiving antennas 14 and 15 can be arranged to be fitted to each other on the same plane.

Further, although in FIG. 4, the example in which the receiving antenna 15 is arranged inside the transmitting antenna 14 is shown, conversely, the transmitting antenna 14 can be arranged inside the receiving antenna 15.

Next, an exemplary application of the power transmission device 1 according to Embodiment 1 will be shown.

Figure 5:
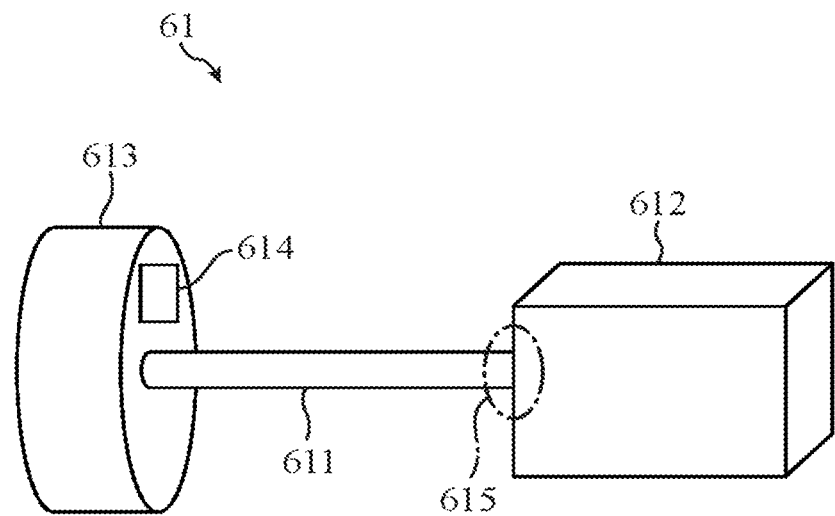
FIG. 5 is a schematic view showing an exemplary application of the power transmission device according to Embodiment 1 of the present invention (in a case in which the transmission/reception unit is disposed in the vicinity of a shaft)

In the example shown in FIG. 5, the transmission/reception unit 12 is disposed in the vicinity of a shaft 611.

The shaft 611 of a vehicle (a moving object) 61 consists of a metallic member in order to ensure the strength as a structure. Therefore, in a conventional power transmission device, it is difficult to provide application to a power transmission via this shaft 611. In contrast to the conventional power transmission device, in the power transmission device 1 of the present invention, it can become difficult for the influence of a metallic member to be exerted on the power transmission device. Therefore, for example, the transmitting antenna 14 can be fixed to a main body 612, and the receiving antenna 15 can be fixed to the shaft 611 (an antenna arrangement portion 615 shown in FIG. 5). As a result, non-contact power supply to sensors (a pneumatic sensor and a speed sensor) 614 and so on disposed in a tire 613 can be carried out.

Although in the example shown in FIG. 5 the vehicle 61 is shown as an example, the present embodiment is not limited to this example, and can also be applied to other moving objects.

Figure 6:
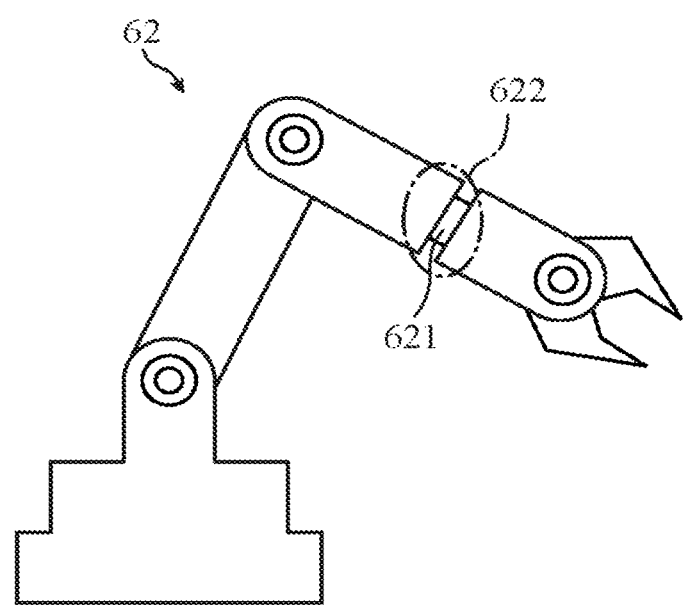
FIG. 6 is a schematic view showing an exemplary application of the power transmission device according to Embodiment 1 of the present invention (in a case in which the transmission/reception unit is disposed in the vicinity of a rotary part of a robot arm)

Further, in an example shown in FIG. 6, the transmission/reception unit 12 of the present invention is disposed in the vicinity of a rotary part 621 of a robot arm 62.

The rotary part 621 of the robot arm 62 consists of a metallic member in order to ensure the strength as a structure, like the above-mentioned shaft. Therefore, in a conventional power transmission device, it is difficult to provide application to a power transmission via this rotary part 621. In contrast to the conventional power transmission device, in the power transmission device 1 of the present invention, it can become difficult for the influence of a metallic member to be exerted on the power transmission device. Therefore, the transmission/reception unit 12 can be disposed in an antenna arrangement portion 622 shown in FIG. 6.

Figure 7:
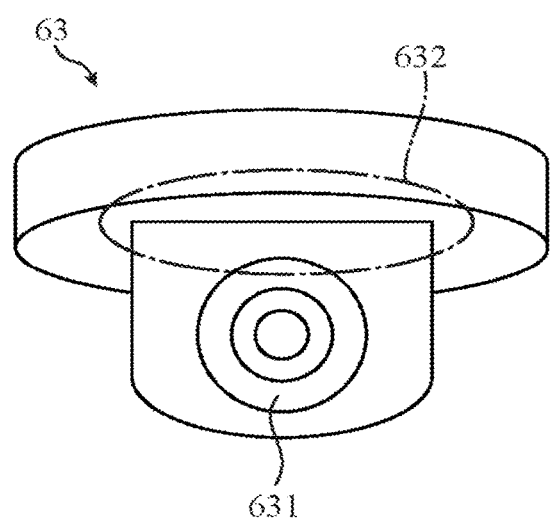
FIG. 7 is a schematic view showing an exemplary application of the power transmission device according to Embodiment 1 of the present invention (in a case in which the transmission/reception unit is disposed in the vicinity of a rotary part of a monitoring camera)

Further, in an example shown in FIG. 7, the transmission/reception unit 12 of the present invention is disposed in the vicinity of a rotary part of a monitoring camera 63.

The monitoring camera 63 that monitors over a full range of 360 degrees in azimuth has the rotary part for rotating a camera main body 631. Therefore, the transmission/reception unit 12 of the present invention can be disposed in the vicinity of this rotary part (an antenna arrangement portion 632).

Figure 8B:
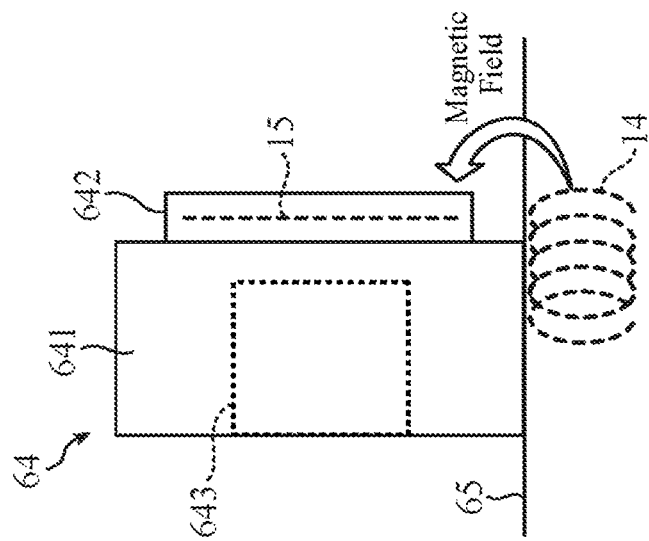
FIGS. 8A and 8B are schematic views showing an exemplary application of the power transmission device according to Embodiment 1 of the present invention (power supply to a vehicle)
Figure 8A:
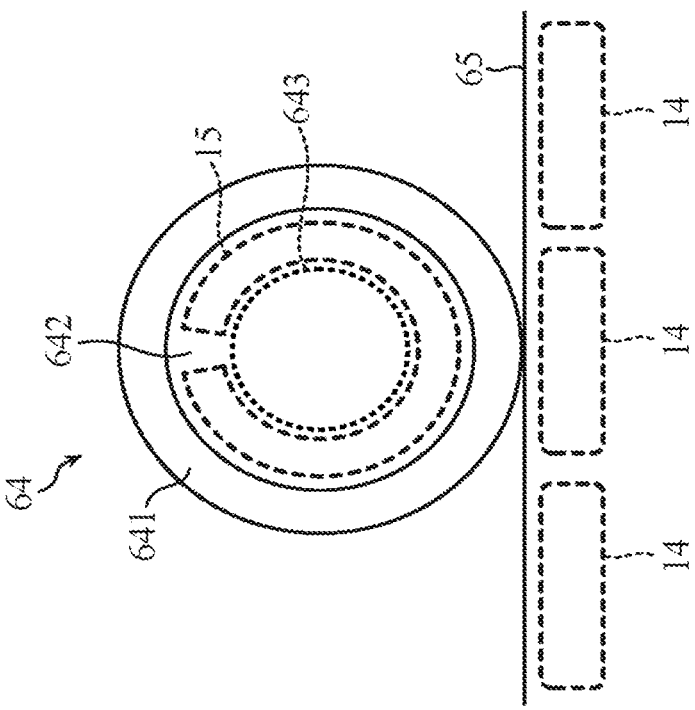

Further, in an example shown in FIGS. 8A and 8B, the power transmission device 1 of the present invention is applied to power supply to a vehicle (a moving object) 64.

In the example shown in FIGS. 8A and 8B, the transmitting antennas 14 of the present invention are embedded under a fixed surface (a road 65) which is opposite to the vehicle 64 while the vehicle 64 is traveling or when the vehicle is standing, and the receiving antenna 15 of the present invention is incorporated in a wheel cap 642 of a tire 641 of the vehicle 64. As a result, even if the receiving antenna 15 is arranged in a state in which the receiving antenna is centered on the central axis of a metallic shaft (not illustrated) of the vehicle 64 (this state includes a state in which the receiving antenna is approximately centered on the central axis), non-contact power supply from the transmitting antennas 14 disposed in the road 65 to the receiving antenna 15 disposed in the vehicle 64 can be carried out while the vehicle 64 is traveling along the road 65 or when the vehicle 64 is standing on the road 65.

By using a wheel cap 642 in which the receiving antenna is incorporated, the receiving antenna 15 can be retrofitted to existing vehicles. Further, because a magnetic field extending in the direction of the width of the road 65 can be generated by forming the transmitting antennas 14 into a helical shape, as shown in FIG. 8B, a power transmission can be carried out even if the position of the vehicle 64 shifts a little from a traveling position or a standing position.

Further, it is expected in an actual situation that the receiving and transmitting antennas 14 and 15 are incorporated in the vehicle 64 and the road 65, respectively, after being solidified by resin material. Therefore, by adjusting the thickness of this resin material, the power transmission can be sufficiently implemented even when puddles exist on the road 65.

Further, FIGS. 8A and 8B show the example in which the receiving antenna 15 is incorporated in the wheel cap 642. Nonetheless, the present embodiment is not limited to this example. For example, the receiving antenna 15 can be incorporated in a wheel 643.

Further, power supply to the vehicle 64 is shown in FIGS. 8A and 8B. Nonetheless, the present embodiment is not limited to this example, and application to other moving object (electric trains, automatic guided vehicles (AGVs), and other objects) can also be provided.

Figure 9:
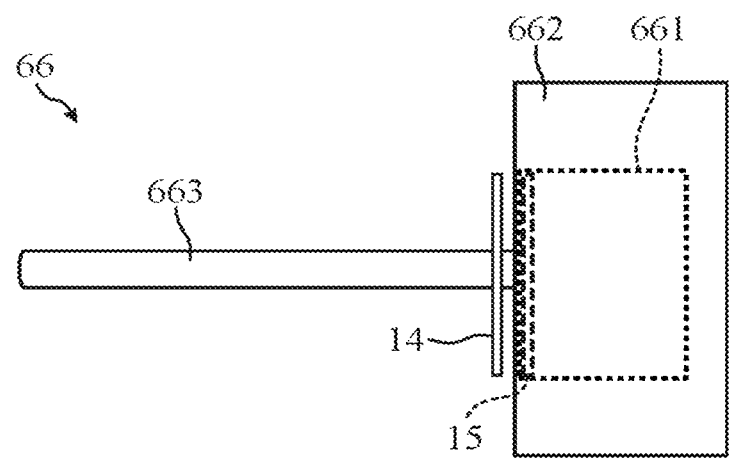
FIG. 9 is a schematic view showing an exemplary application of the power transmission device according to Embodiment 1 of the present invention (power supply to an in-wheel motor)

Further, in an example shown in FIG. 9, the power transmission device 1 of the present invention is applied to power supply to an in-wheel motor 661.

In recent years, a vehicle (a moving object) 66 that includes electric motors (in-wheel motors 661) incorporated in tires 662, and that drives wheels by using these in-wheel motors 661 has been developed. Therefore, by fixing the transmitting antenna 14 of the present invention to a shaft 663, and fixing the receiving antenna 15 of the present invention to each of the in-wheel motors 661, non-contact power supply from the shaft 663 to the in-wheel motor 661 that rotates can be carried out.

An inverter is disposed inside each of the in-wheel motors 661, and the speed of the vehicle 66 can be adjusted by performing electronic control on this inverter. Therefore, the power transmission device 1 should just transmit electric power having a single frequency.

Further, although in FIG. 9 the vehicle 66 is shown as an example, the present embodiment is not limited to this example, and the power transmission device can also be applied to other moving objects (minicars and so on).

Figure 10:
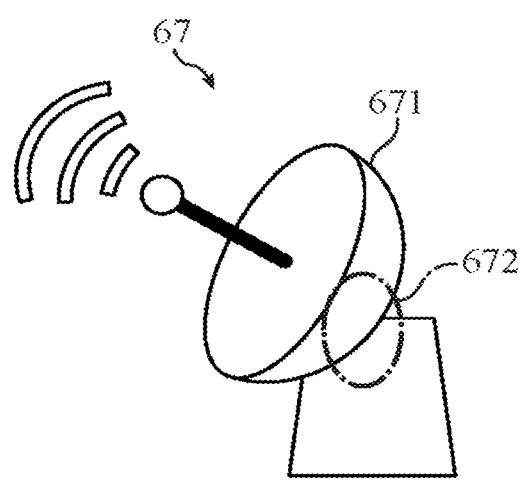
FIG. 10 is a schematic view showing an exemplary application of the power transmission device according to Embodiment 1 of the present invention (in a case in which the transmission/reception unit is disposed in the vicinity of a rotary part of a radar)

Further, in an example shown in FIG. 10, the transmission/reception unit 12 of the present invention is disposed in the vicinity of a rotary part of a radar device 67.

The radar device 67 that monitors over a full range of 360 degrees in azimuth has the rotary part for rotating a radar main body 671. Therefore, the transmission/reception unit 12 of the present invention can be disposed in the vicinity of this rotary part (an antenna arrangement portion 672).

Figure 11:
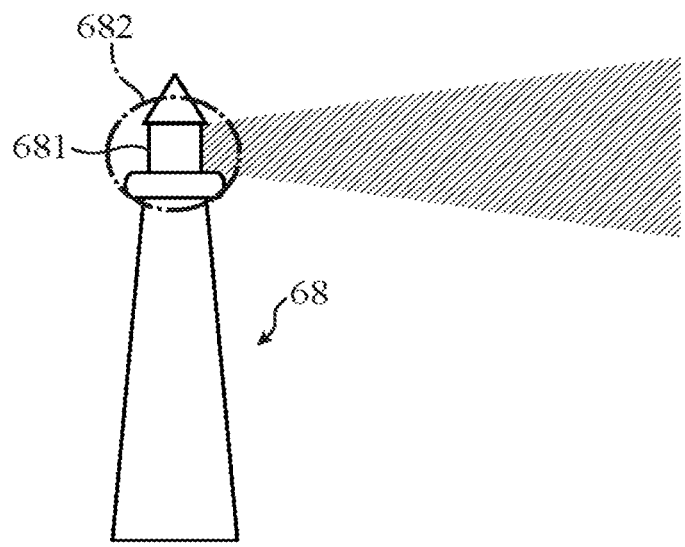
FIG. 11 is a schematic view showing an exemplary application of the power transmission device according to Embodiment 1 of the present invention (in a case in which the transmission/reception unit is disposed in the vicinity of a shading wall of a lighthouse)

Further, in an example shown in FIG. 11, the transmission/reception unit 12 of the present invention is disposed in the vicinity of a shading wall 681 of a lighthouse 68.

In the lighthouse 68, a light (not illustrated) and the shading wall 681 that has an opening for projecting light from the light to the outside, and that rotates are disposed. Therefore, the transmission/reception unit 12 of the present invention can be disposed in the vicinity of this shading wall 681 (an antenna arrangement portion 682).

Figure 12:
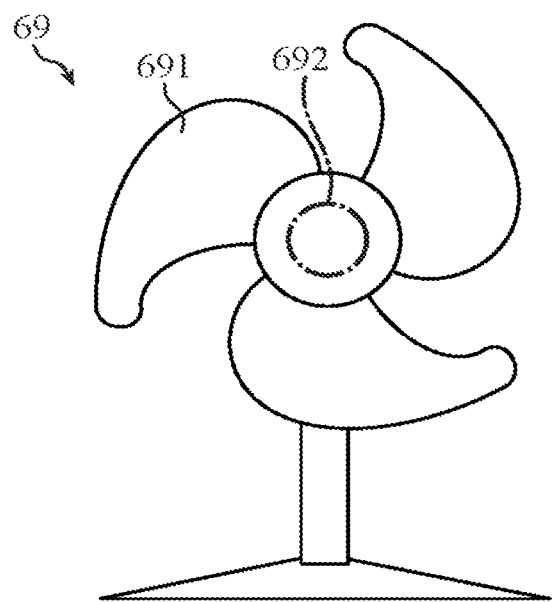
FIG. 12 is a schematic view showing an exemplary application of the power transmission device according to Embodiment 1 of the present invention (in a case in which the transmission/reception unit is disposed in the vicinity of a rotary part of a fan)

Further, in an example shown in FIG. 12, the transmission/reception unit 12 of the present invention is disposed in the vicinity of a rotary part of a fan 69.

The fan 69 has the rotary part for rotating blades 691. Therefore, the transmission/reception unit 12 of the present invention can be disposed in the vicinity of this rotary part (an antenna arrangement portion 692). As a result, non-contact power supply can be carried out when, for example, changing the angles of the blades 691 or causing a light fixed at an end side of the rotary part to light up.

Although in FIG. 12 the fan 69 is shown as an example, the present embodiment is not limited to this example, and the power transmission device can also be applied to other devices having blades 691 (aerogenerators, helicopters, propeller planes, the screws of boats, and so on).

Figure 13A:
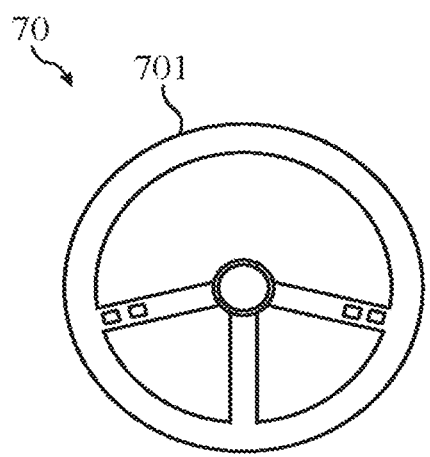
Figure 13B:
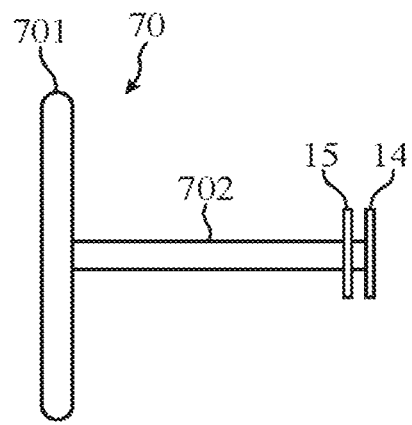
FIG. 13B is a side view.

Further, in an example shown in FIGS. 13A and 13B, the power transmission device 1 of the present invention is applied to power supply to a steering of a steering wheel 701 of a vehicle 70.

In the example shown in FIGS. 13A and 13B, the receiving antenna 15 is fixed to a rotary side of a base portion of a steering shaft 702, and the transmitting antenna 14 is fixed to a fixed side of the base portion. As a result, non-contact power supply to the steering can be carried out.

Although in FIGS. 13A and 13B the vehicle 70 is shown as an example, the present embodiment is not limited to this example, and the power transmission device can also be applied to other devices having a steering wheel 701 (moving objects, such as motorbikes and battery-assisted bicycles, game machines, and so on).

Figure 14B:
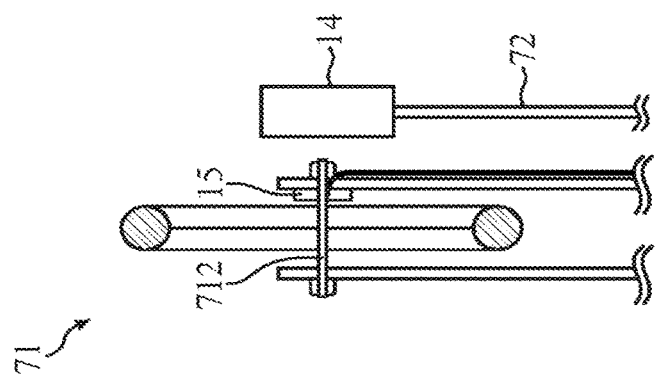
FIGS. 14A and 14B are schematic views showing an exemplary application of the power transmission device according to Embodiment 1 of the present invention (power supply to a bicycle)
Figure 14A:
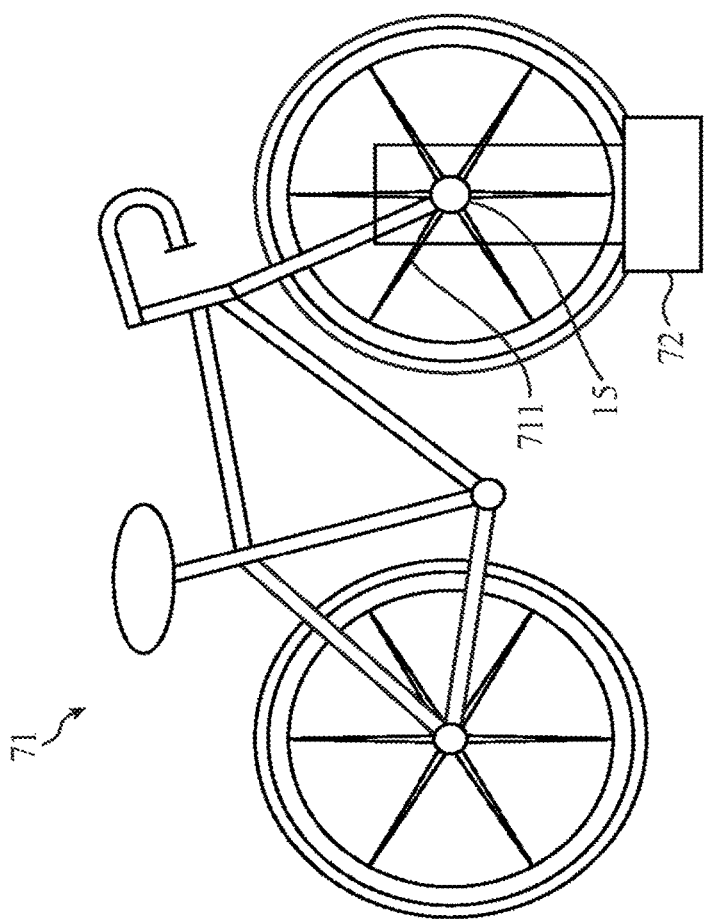

Further, in an example shown in FIGS. 14A and 14B, the power transmission device 1 of the present invention is applied to power supply to a battery-assisted bicycle 71.

In the example shown in FIGS. 14A and 14B, the transmitting antenna 14 of the present invention is fixed to each bicycle parking stand 72 incorporated in a bicycle parking lot for the battery-assisted bicycle 71, and the receiving antenna 15 of the present invention is fixed to spokes 711 of the battery-assisted bicycle 71. In FIG. 14A, in order to make the figure legible, the transmitting antenna 14 is not illustrated. As a result, when the battery-assisted bicycle 71 is parked in the bicycle parking lot, non-contact power supply from the transmitting antenna 14 disposed in a bicycle parking stand 72 to the receiving antenna 15 disposed in the battery-assisted bicycle 71 can be carried out, and electric power can be supplied to the battery (not illustrated) of the battery-assisted bicycle 71. Further, in this case, the transmitting and receiving antennas 14 and 15 of the present invention can be arranged opposite to a metallic shaft 712 of the battery-assisted bicycle 71.

Although in the example shown in FIGS. 14A and 14B power supply to the battery-assisted bicycle 71 is shown, the present embodiment is not limited to this example, and the power transmission device can also be applied to electric wheelchairs, motorbikes, and so on.

As mentioned above, according to this Embodiment 1, because the power transmission device is constructed in such a way that the device includes the transmission/reception unit 12 having the transmitting antenna 14 and the receiving antenna 15 that carries out a wireless power transmission in cooperation with the transmitting antenna 14, and each of the transmitting and receiving antennas 14 and 15 includes a coil which has a shape in which a portion through which a current flows in a direction extends along another portion through which a current flows in an opposite direction, a power transmission can be implemented even in a case in which metallic member (a shaft 51) exists in the surroundings of the power transmission device. Further, because the space between the metallic member and the transmission/reception unit 12 can be made to be narrower than that in conventional structures, the device can be downsized.

Embodiment 2

In Embodiment 1, the case in which the transmission/reception unit 12 is disposed for the shaft 51 which is a metallic member is shown. In contrast to this, in Embodiment 2, a case in which a transmission/reception unit 12 is arranged inside a housing 52 including a metallic member will be shown. The entire structure of a power transmission device 1 is the same as that shown in FIG. 1, and the explanation of the structure will be omitted hereafter.

Figure 15A:
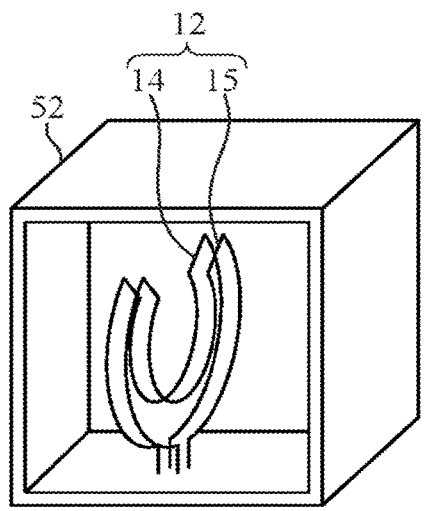
FIGS. 15A and 15B are schematic views showing exemplary structures of a transmission/reception unit in Embodiment 2 of the present invention.

FIG. 15A shows a case in which the transmission/reception unit 12 is arranged inside the metallic housing 52 whose front face is open. It is assumed that the shape of a transmitting antenna 14 and receiving antenna 15 is the same as any of those shown in FIGS. 2A to 2C.

In this case, in the antenna shape of the present invention, the directions of currents flowing through two lines arranged close to each other are different from each other by 180 degrees, like in the case of Embodiment 1. Therefore, in a narrow area inside each loop surface, the magnetic flux direction becomes uniform and the magnetic flux becomes dense. By using this magnetic field having a high magnetic flux density, the transmission of power from the transmitting antenna 14 to the receiving antenna 15 is carried out. In contrast, because the magnetic flux cancels out outside the loop surfaces, no magnetic field having a high magnetic flux density spreads out over the surroundings of the antennas, while only a magnetic field having a low magnetic flux density reaches the metallic member (the housing 52) existing in the surroundings of the antennas. Therefore, the influence (an eddy current loss and so on) of this housing 52 can be reduced, and a power transmission with high energy efficiency can be carried out.

From the above, even if the housing 52 is a metallic member, the transmission of power between the transmitting and receiving antennas 14 and 15 can be carried out.

Figure 2C:
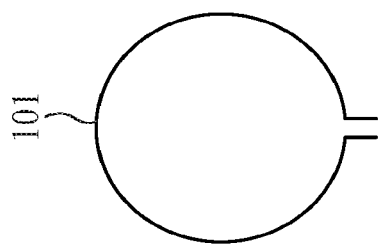
FIGS. 2A to 2C are schematic views showing the exemplary structures of a transmission/reception unit in connection with Embodiment 1 of the present invention.
Figure 2B:
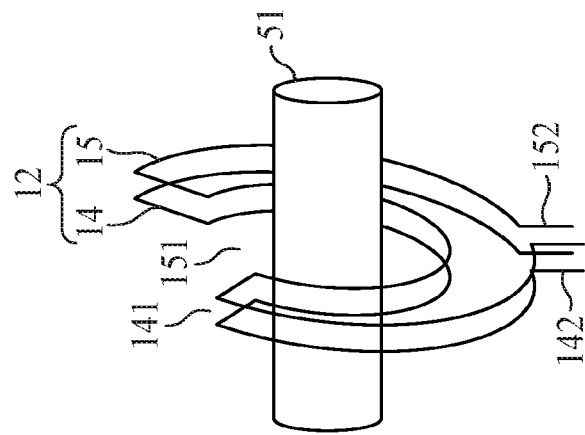
Figure 2A:
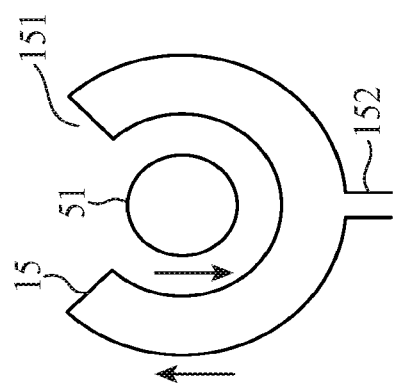

In the example shown in FIG. 15A, the loop surfaces of the transmitting and receiving antennas 14 and 15 are circular-arc-shaped, like those shown in FIGS. 2A to 2C. However, in a case in which the transmission/reception unit 12 is not wound around a shaft 51 or the like, it is not necessary to form the loop surface of each of the antennas into a circular arc shape, and the loop surface of each of the antennas can be formed into another shape (a rectangular shape, a rod shape, or the like).

Figure 15B:
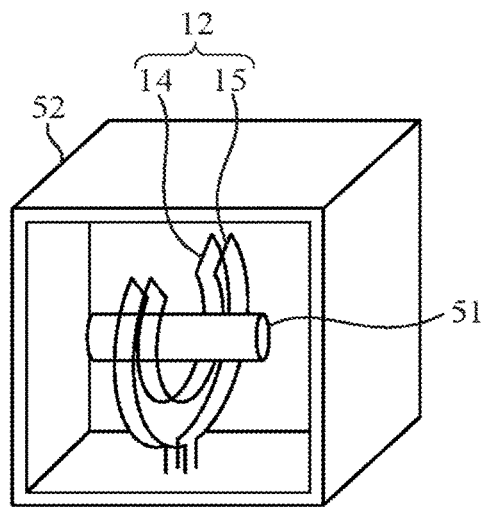

Further, FIG. 15B shows a case in which the transmission/reception unit 12 indirectly wound around a metallic shaft 51 is arranged inside a metallic housing 52 whose front face is open.

Also in this case, because the shaft 51 is located outside the loop surfaces, like in the case of Embodiment 1, the interlinkage of a magnetic flux between the transmitting and receiving antennas 14 and 15 is not prevented.

Further, in the antenna shape of the present invention, the directions of currents flowing through two lines arranged close to each other are different from each other by 180 degrees. Therefore, in a narrow area inside each loop surface, the magnetic flux direction becomes uniform and the magnetic flux becomes dense. By using this magnetic field having a high magnetic flux density, the transmission of power from the transmitting antenna 14 to the receiving antenna 15 is carried out. In contrast, because the magnetic flux cancels out outside the loop surfaces, no magnetic field having a high magnetic flux density spreads out over the surroundings of the antennas, while only a magnetic field having a low magnetic flux density reaches the metallic members (the shaft 51 and the housing 52) existing in the surroundings of the antennas. Therefore, the influence (an eddy current loss and so on) of these shaft 51 and housing 52 can be reduced, and a power transmission with high energy efficiency can be carried out.

From the above, even if the shaft 51 and the housing 52 are metallic members, the transmission of power between the transmitting and receiving antennas 14 and 15 can be carried out. In the case shown in FIG. 15B, the transmission/reception unit 12 needs to be arranged apart, at a distance of one-tenth or more the inner diameter of a minimum-sized antenna of the transmitting and receiving antennas 14 and 15, from each of the metallic members (the shaft 51 and the housing 52).

FIGS. 15A and 15B show the cases in which the transmission/reception unit 12 is arranged inside the metallic housing 52 whose front face is open. Nonetheless, the present embodiment is not limited to these cases. It is similar to the above-mentioned things also in a case in which the transmission/reception unit 12 is arranged inside a housing 52 which is wholly covered by a metallic member, as well as in a case in which the transmission/reception unit 12 is arranged inside a housing 52 which in part includes a metallic member.

Further, although FIGS. 15A and 15B show the cases in which the transmission/reception unit 12 is arranged inside the metallic housing 52, it is similar to the above-mentioned things also in a case in which another metallic peripheral member exists in the surroundings of the transmission/reception unit 12.

Figure 16:
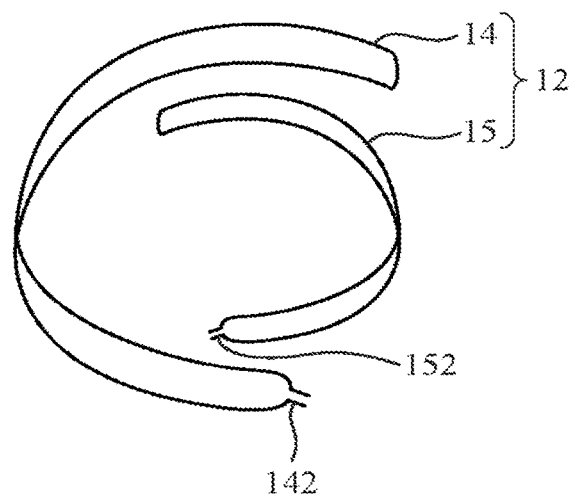
FIG. 16 is a schematic view showing another exemplary structure of the transmission/reception unit in Embodiment 1 of the present invention.

Further, FIGS. 15A and 15B show the cases in which the loop surfaces of the transmitting and receiving antennas 14 and 15 are directed toward a direction parallel to the direction of a central axis. Nonetheless, the present embodiment is not limited to these cases. For example, as shown in FIG. 16, the loop surfaces of the transmitting and receiving antennas 14 and 15 can be directed to the central axis. This allows the further suppression of the influence of a metallic member existing in a plane parallel to the direction of the central axis.

Although FIG. 16 shows the case in which the receiving antenna 15 is arranged inside the transmitting antenna 14, conversely, the transmitting antenna 14 can be arranged inside the receiving antenna 15. Although FIG. 16 shows the case in which the transmitting and receiving antennas 14 and 15 are arranged in a fitted manner, the transmitting and receiving antennas can be arranged opposite to each other along the direction of the central axis.

Next, exemplary applications of the power transmission device 1 according to Embodiment 2 will be shown.

Figure 17:
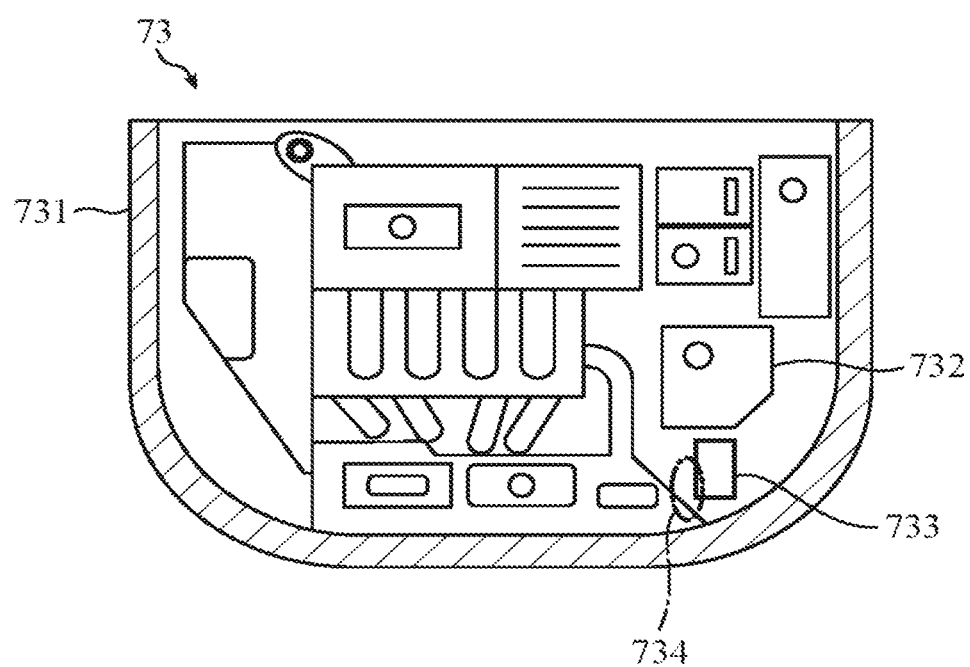
FIG. 17 is a schematic view showing an exemplary application of a power transmission device according to Embodiment 2 of the present invention (in a case in which transmission/reception unit is disposed inside an engine room)

FIG. 17 shows an example in which the transmission/reception unit 12 of the present invention is arranged inside an engine room 731 of a vehicle (a moving object) 73.

The engine room 731 of the vehicle 73 is made from a metallic material, and many pieces of equipment 732 each made from a metallic material are disposed inside the engine room 731. Therefore, it is difficult to arrange any conventional power transmission device inside this engine room 731. In contrast to conventional power transmission devices, in the power transmission device 1 of the present invention, it can become difficult for the influence of a metallic member to be exerted on the power transmission device. Therefore, the transmission/reception unit 12 can be arranged inside the engine room 731 (in an antenna arrangement portion 734). As a result, for example, non-contact power supply to a sensor 733 or the like disposed inside the engine room 731 can be carried out.

Although in FIG. 17 the vehicle 73 is shown as an example, the present embodiment is not limited to this example, and the power transmission device can also be applied to other moving objects.

Figure 18:
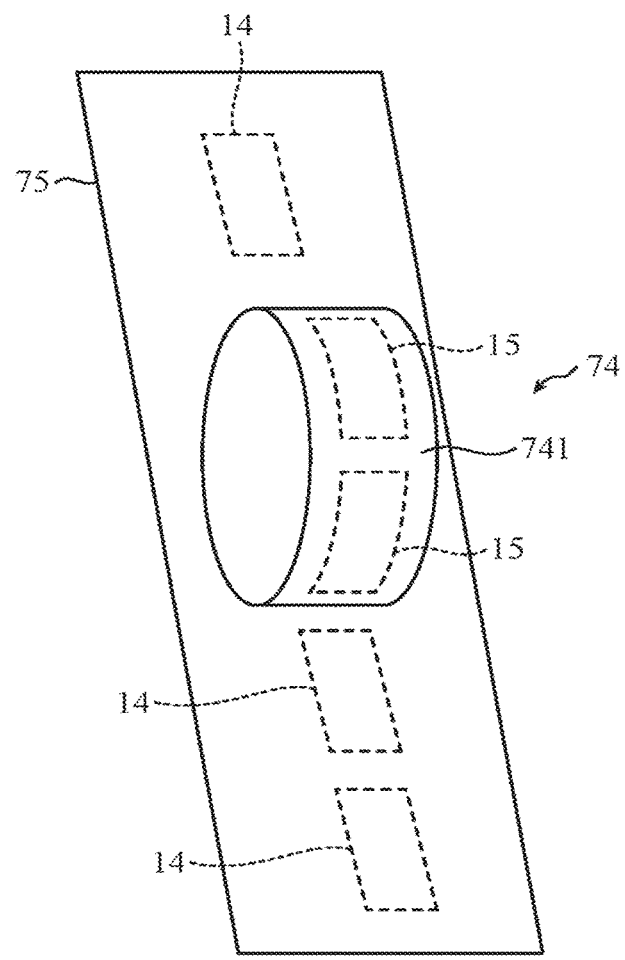
FIG. 18 is a schematic view showing an exemplary application of the power transmission device according to Embodiment 1 of the present invention (power supply to a vehicle)

Further, FIG. 18 shows an example in which the power transmission device 1 of the present invention is applied to power supply to a vehicle (a moving object) 74.

In the example shown in FIG. 18, transmitting antennas 14 of the present invention are embedded under a fixed surface (a road 75) which is opposite to the vehicle 74 while the vehicle 74 is traveling or when the vehicle 74 is standing, and the receiving antenna 15 of the present invention is mounted in a tread surface or the like of a tire 741 of the vehicle 74. As a result, non-contact power supply from the transmitting antennas 14 disposed in the road 75 to the receiving antenna 15 disposed in the vehicle 74 can be carried out while the vehicle 74 is traveling along the road 75 or when the vehicle 74 is standing on the road 75.

Further, it is assumed that actually, after each of the transmitting and receiving antennas 14 and 15 is hardened by using a resin material, the receiving and transmitting antennas are disposed in the vehicle 74 and the road 75. Therefore, by adjusting the thickness of this resin material, a power transmission can be sufficiently implemented also when there are puddles on the road 75.

Further, power supply to the vehicle 74 is shown in FIG. 18. Nonetheless, the present embodiment is not limited to this example, and application to other moving objects (automatic guided vehicles (AGVs), and so on) can also be provided.

Figure 19:
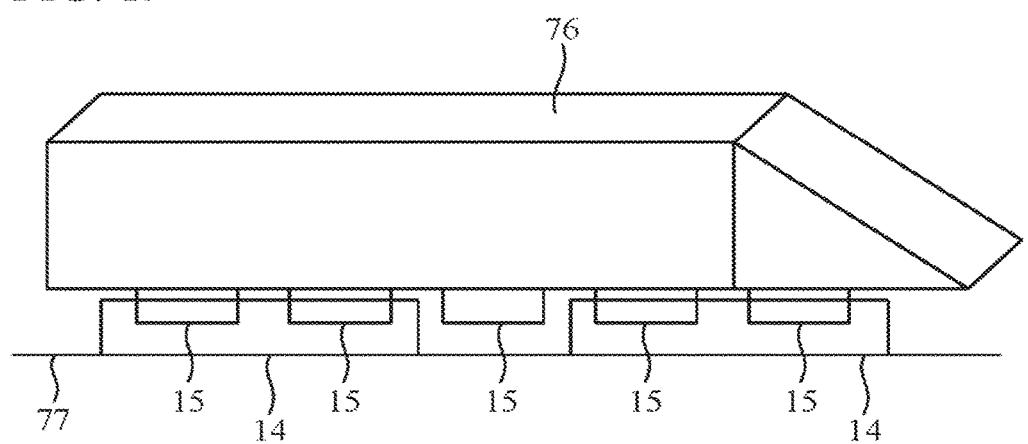
FIG. 19 is a schematic view showing an exemplary application of the power transmission device according to Embodiment 1 of the present invention (power supply to a magnetically levitated train)

Further, FIG. 19 shows an example in which the power transmission device 1 of the present invention is applied to power supply to a magnetically levitated train (a moving object) 76.

In the example shown in FIG. 19, transmitting antennas 14 of the present invention are disposed on a fixed surface (a road surface 77) which is opposite to the magnetically levitated train 76 while the magnetically levitated train is traveling or when the magnetically levitated train is standing, and receiving antennas 15 of the present invention are disposed on a bottom surface of the magnetically levitated train 76. The transmitting antennas 14 are arranged so as to be perpendicular to the road surface 77, and the receiving antennas 15 are arranged so as to be perpendicular to the bottom surface of the magnetically levitated train 76. As a result, non-contact power supply from the transmitting antennas 14 disposed on the road surface 77 to the receiving antennas 15 disposed in the magnetically levitated train 76 can be carried out while the magnetically levitated train 76 is traveling on the road surface 77 or when the magnetically levitated train 76 is standing on the road surface 77.

FIG. 19 shows case in which the transmitting antennas 14 are disposed on the road surface 77, and the receiving antennas 15 are disposed on the bottom surface of the magnetically levitated train 76. Nonetheless, the present embodiment is not limited to this case, the transmitting antennas 14 can be disposed on a side wall which is a fixed surface opposite to the magnetically levitated train 76 while the magnetically levitated train 76 is traveling or when the magnetically levitated train is standing, and the receiving antennas 15 can be disposed on a side surface of the magnetically levitated train 76.

Although in FIG. 18 power supply to the magnetically levitated train 76 is shown, the present embodiment is not limited to this example, and the power transmission device can also be applied to other levitated objects (hovercrafts and so on).

As mentioned above, according to this Embodiment 2, because the power transmission device is constructed in such a way that the device includes the transmission/reception unit 12 having the transmitting antenna 14 and the receiving antenna 15 that carries out a wireless power transmission in cooperation with the transmitting antenna 14, and each of the transmitting and receiving antennas 14 and 15 includes a coil which has a shape in which a portion through which a current flows in a direction extends along another portion through which a current flows in an opposite direction, a power transmission can be implemented even in a case in which metallic members (a housing 52 and another peripheral member) exist in the surroundings of the power transmission device. Further, because the space between each metallic member and the transmission/reception unit 12 can be made to be narrower than that in conventional structures, the device can be downsized.

Embodiment 3

In Embodiment 2, the case in which the transmission/reception unit 12 is arranged inside the housing 52 including a metallic member is shown. In contrast to this, in Embodiment 3, a case in which shielding members 53 are arranged between a transmission/reception unit 12 and metallic members will be shown.

Figure 20C:
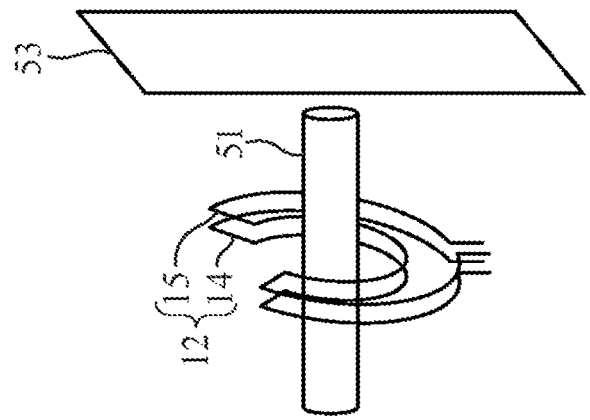
FIGS. 20A-20C are schematic views showing exemplary structures of a transmission/reception unit of Embodiment 3 of the present invention.
Figure 20B:
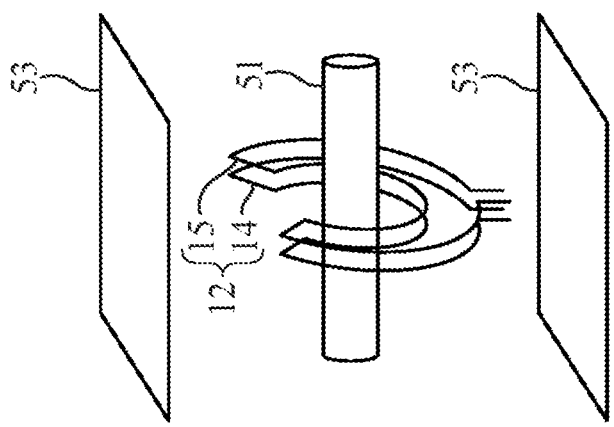
Figure 20A:
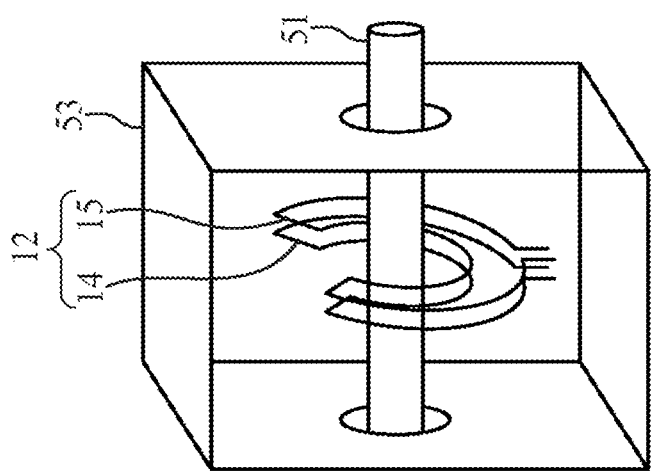

Shielding members 53 are arranged between the transmission/reception unit 12 and metallic members, as shown in FIGS. 20A and 20B. In FIGS. 20A and 20B, the metallic members are not illustrated. As each shielding member 53, a magnetic sheet or a metallic loop can be used. A magnetic sheet is acquired by forming a magnetic material, such as ferrite or amorphous, having high real part and a low imaginary part of magnetic permeability into a sheet shape. Shielding members 53 can be arranged opposite to all of the surrounding metallic members, or can be arranged opposite to only some of the surrounding metallic members. FIG. 20A shows a case in which all faces except a front face are enclosed by shielding members 53, FIG. 20B shows a case in which shielding members 53 are arranged only at upper and lower faces, and FIG. 20C shows a case in which shielding members 53 are arranged only at right and left faces.

By using shielding members 53 in this way, leakage of a magnetic field from the transmission/reception unit 12 to the surrounding metallic members can be further reduced, and the power transmission efficiency can be further increased.

Further, not only a magnetic field but also an electric field is emitted from the transmission/reception unit 12. Therefore, in order to prevent this electric field from leaking toward the metallic members, each shielding member 53 can consist of, for example, two magnetic sheets 531 and a conductor 532 containing free electrons and arranged between the two magnetic sheets 531, as shown in FIG. 21. As the conductor 532, for example, there is provided a metallic member, such as copper or aluminum, a carbon fiber, a conductive plastic, or the like. Further, the conductor 532 is formed into a shape such as a sheet shape, a mesh state, or a looped shape.

Although in FIG. 21 the case in which the magnetic sheets 531 are disposed on both side surfaces of the conductor 532 shown, a magnetic sheet 531 can be disposed only on one of the side surfaces.

As mentioned above, according to this Embodiment 3, because shielding members 53 arranged between the transmission/reception unit 12 and metallic members are disposed, leakage of a magnetic field from the transmission/reception unit 12 to the metallic members can be reduced more greatly compared with that in Embodiment 2, and the power transmission efficiency can be improved more greatly compared with that in Embodiment 2.

Embodiment 4

In Embodiments 1 to 3, the case in which a single transmission/reception unit 12 is disposed is shown. In contrast to this, in Embodiment 4, a case in which plural transmission/reception units 12 are disposed will be shown. In figures, a case in which three transmission/reception units 12 are disposed is shown, and the suffixes "a" to "c" are added to each of reference numerals denoting functional units.

In an example shown in FIGS. 22A and 22B, plural transmitting antennas 14 are disposed in the same plane and around a central axis, plural receiving antennas 15 are disposed in the same plane and around the central axis, and each of pairs of transmitting antennas 14 and receiving antennas 15 is arranged opposite to each other along the direction of the central axis. In FIGS. 22A and 22B, lead portions 142 and 152 connected to feed terminals are not illustrated.

In a case in which a shaft 51 is a non-rotatable body, by arranging the plural transmitting antennas 14 and the plural receiving antennas 15 in such a way that the transmitting and receiving antennas are opposite to each other in one to one correspondence, as shown in FIGS. 22A and 22B, a power transmission in each pair can be independently implemented.

In contrast, in a case in which the shaft 51 is a rotatable body and multiple power transmissions are carried out via this rotatable body, the transmitting antennas 14 and the receiving antennas 15 rotate independently. For example, in a state in which a power transmission from a transmitting antenna 14a to a receiving antenna 15a is being carried out, as shown in FIGS. 22A and 22B, when either the transmit side or the receive side rotates by 120 degrees, the transmitting antenna 14a is placed opposite to another receiving antenna (15b or 15c). A control unit that changes the pairs of transmitting antennas 14 and receiving antennas 15 with the above-mentioned rotation is disposed in either the transmit side or the receive side. As a result, even in the case in which multiple power transmissions are carried out via the rotatable body, a power transmission in each pair can be independently implemented.

For example, when either the transmit side or the receive side rotates by 60 degrees from the attitude shown in FIGS. 22A and 22B, two receiving antennas 15 are placed opposite to each transmitting antenna 14 with the same degree of overlap, and the pairs cannot be changed. To address this, for example, a control operation of switching off the power transmission in every pair can be carried out for a range between +10 degrees and −10 degrees which produces such a state.

Further, when it is not necessary to implement a power transmission in each pair, the above-mentioned change of the pairs is unnecessary.

Figure 23B:
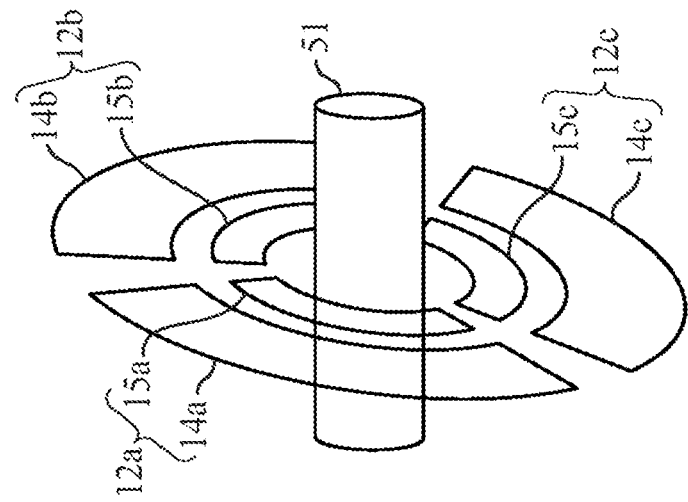
FIGS. 23A and 23B are schematic views showing other exemplary structures of the transmission/reception unit of Embodiment 4 of the present invention.
Figure 23A:
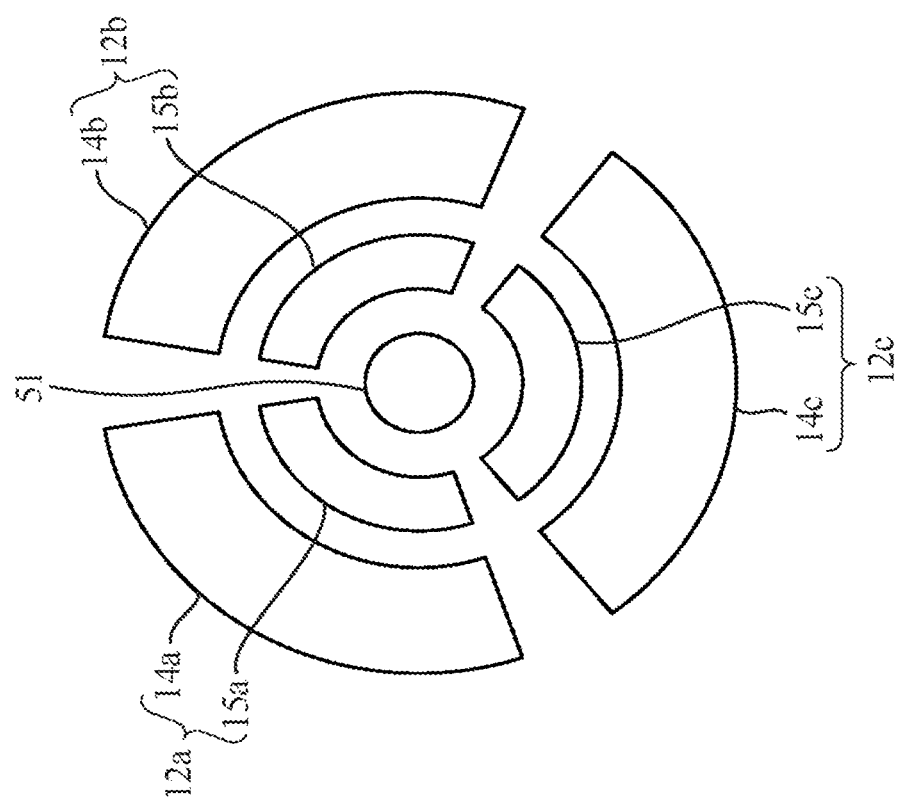

Further, in an example shown in FIGS. 23A and 23B, plural transmitting antennas 14 are disposed in the same plane and around a central axis, plural receiving antennas 15 are disposed in the same plane and around the central axis, and each of pairs of transmitting antennas 14 and receiving antennas 15 is arranged in a fitted manner. In FIGS. 23A and 23B, lead portions 142 and 152 connected to feed terminals are not illustrated. Even in this antenna arrangement, multiple power transmissions can be carried out, like in the case of the structure shown in FIGS. 22A and 22B.

Although in FIGS. 23A and 23B the case in which the receiving antennas 15 are arranged inside the transmitting antennas 14 is shown, conversely, the transmitting antennas 14 can be arranged inside the receiving antennas 15.

Figure 24:
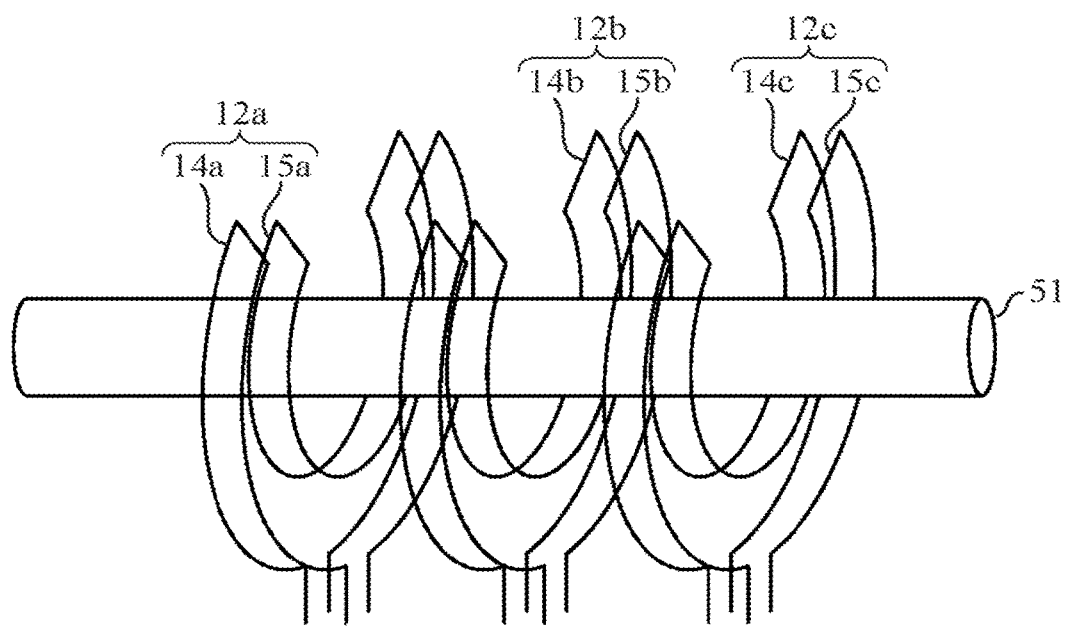
FIG. 24 is a schematic view showing another exemplary structure of the transmission/reception unit in Embodiment 4 of the present invention.

Further, in an example shown in FIG. 24, transmitting antennas 14 and receiving antennas 15 are arranged along the direction of a central axis in such a way that each of the transmitting antennas is opposite to a corresponding one of the receiving antennas, and plural transmission/reception units 12 are arranged opposite to one another along the direction of the central axis. Even in this antenna arrangement, multiple power transmissions can be carried out, like in the case of the structure shown in FIGS. 22A and 22B.

Even in the antenna arrangement shown in FIG. 24, there is no leakage of electric power between adjacent transmission reception units (for example, between a transmitting antenna 14b and a receiving antenna 15a). More specifically, according to the present invention, each of the transmitting and receiving antennas 14 and 15 is formed so as to have a shape which is acquired by denting a conventional antenna shape, so that their loop surfaces (areas via which electric power is transmitted) are narrowed. Therefore, even if the plural transmission/reception units 12 are arranged close to one another, leakage of electric power between transmission/reception units can be prevented. Therefore, it is not necessary to dispose a shielding member between transmission/reception units, unlike in the case of conventional structures.

Embodiment 5

In Embodiment 5, a structure of reducing the influence of a metallic member existing in the surroundings by using a transmitting antenna 14 and a receiving antenna 15 having an antenna shape different from those shown in Embodiments 1 to 4 will be shown. The entire structure of a power transmission device 1 is the same as that shown in FIG. 1, and the explanation of the entire structure will be omitted hereafter.

An exemplary structure of the transmitting and receiving antennas 14 and 15 will be explained with reference to FIGS. 25A to 25C. FIGS. 25A and 25B show a case in which the transmitting and receiving antennas 14 and 15 are arranged opposite to each other in the direction of a central axis.

As shown in these FIGS. 25A and 25B, the transmitting and receiving antennas 14 and 15 are constructed in such a way that plural spiral-shaped coils 143 and 153, each having a smaller size than outer diameters of the antennas and having a loop surface parallel to the same plane, are connected in cascade. Further, FIGS. 25A and 25B show a case in which a shaft 51 which is a metallic member is arranged on the central axis of the transmitting and receiving antennas 14 and 15.

Although in the figures a case in which the shaft 51 is a structural rotatable body and the transmitting and receiving antennas 14 and 15 can rotate independently is shown, the shaft 51 can be a non-rotatable body. Further, although in the figures the case in which the coils 143 and 153 are spiral-shaped is shown, the coils can be helical-shaped. Further, the shapes and the numbers of turns of the coils 143 and 153 are not limited to the ones shown in the figures.

By forming the transmitting and receiving antennas 14 and 15 into such an antenna shape as shown in FIGS. 25A and 25B, a magnetic field having a high magnetic flux density occurs in each of the small coils 143 and 153 which is wound in a spiral or helical form. By using this magnetic field having a high magnetic flux density, the transmission of power from the transmitting antenna 14 to the receiving antenna 15 is carried out. On the other hand, because the sizes of the coils 143 and 153 are sufficiently smaller than those of the transmitting and receiving antennas 14 and 15, no magnetic field having a high magnetic flux density spreads out over the surroundings of the antennas, while only a magnetic field having a low magnetic flux density reaches the metallic member (the shaft 51) existing in the surroundings of the antennas. Therefore, the influence (an eddy current loss and on) of this shaft 51 can be reduced, and a power transmission with high energy efficiency can be implemented.

From the above, even if the shaft 51 is a metallic member, the transmission of power between the transmitting and receiving antennas 14 and 15 can be carried out. By arranging the transmission/reception unit 12 apart, at a distance of the radius of one having a minimum size of the coils 143 and 153, or more from the metallic member (the shaft 51), the power transmission efficiency is maximized.

Further, in a case in which the shaft 51 is a rotatable body and a power source line is connected to a load device and other equipment via this rotatable body, the transmitting and receiving antennas 14 and 15 rotate independently. Therefore, by disposing a larger number of coils 143 and 153, the time period during which the coils 143 are opposite to the coils 153 can be lengthened, and the power transmission efficiency can be further improved.

FIGS. 25A and 25B show the case in which the transmitting and receiving antennas 14 and 15 are arranged opposite to each other in the direction of the central axis. Nonetheless, the present embodiment is not limited to this case. For example, as shown in FIGS. 26A and 26B, the transmitting and receiving antennas 14 and 15 can be arranged to be fitted to each other on the same plane.

Figure 26A:
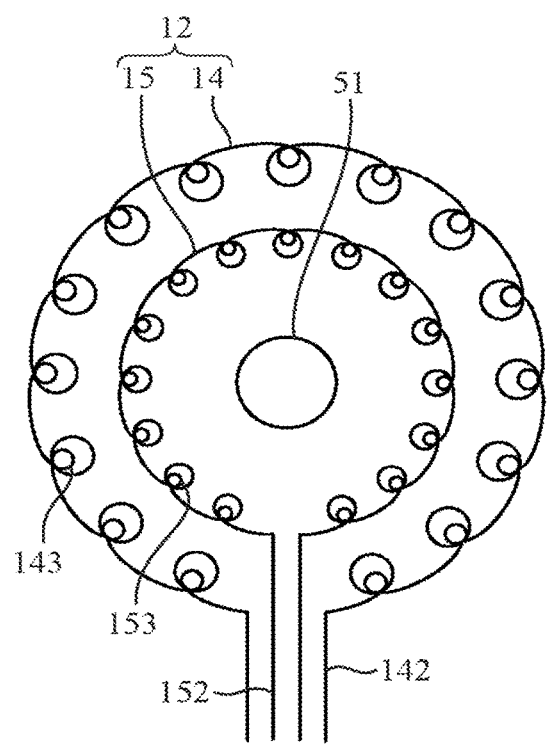
FIGS. 26A and 26B are schematic views showing another exemplary structure of the transmission/reception unit of Embodiment 5 of the present invention.
Figure 26B:
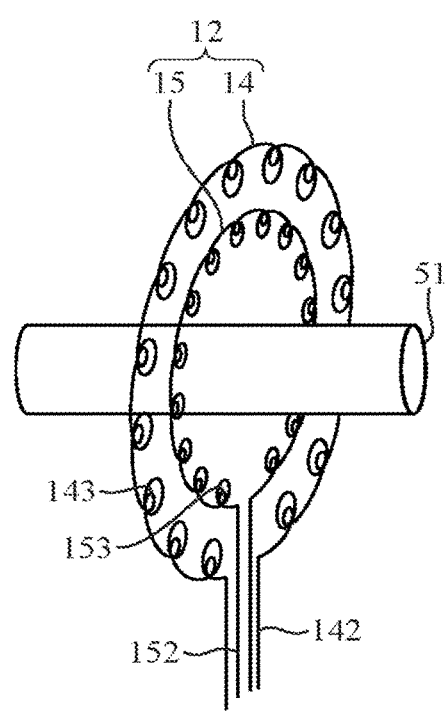

Although in FIGS. 26A and 26B the example in which the receiving antenna 15 is arranged inside the transmitting antenna 14 is shown, conversely, the transmitting antenna 14 can be arranged inside the receiving antenna 15. Further, in this case, by arranging the coils 143 of the transmitting antenna 14 and the coils 153 of the receiving antenna 15 close to each other at a distance shorter than the radius of one having a minimum size of the coils 143 and 153 from each other, the power transmission efficiency can be improved.

Figure 27:
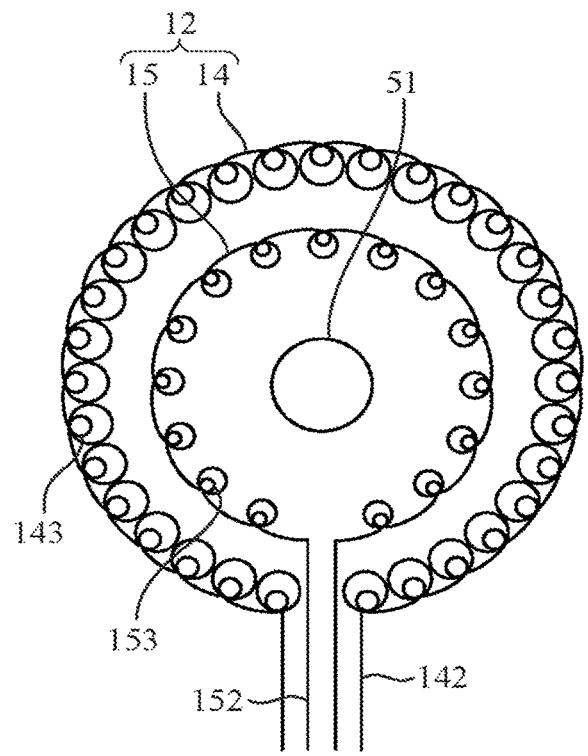
FIG. 27 is a schematic view showing another exemplary structure of the transmission/reception unit in Embodiment 5 of the present invention.

Further, although in FIGS. 25 and 26 the case in which the number of coils 143 of the transmitting antenna 14 and the number of coils 153 of the receiving antenna 15 are equal is shown, the number of coils 143 can be different from the number of coils 153. For example, as shown in FIG. 27, by making the number of coils 143 of the transmitting antenna 14 be larger than the number of coils 153 of the receiving antenna 15, a smoother power transmission can be carried out.

Further, the power transmission device 1 according to Embodiment 5 can be applied to the structures shown in, for example, FIGS. 5 to 14.

As mentioned above, according to this Embodiment 5, because the power transmission device is constructed in such a way that the device includes the transmission/reception unit 12 having the transmitting antenna 14 and the receiving antenna 15 that carries out a wireless power transmission in cooperation with the transmitting antenna 14, and the transmitting and receiving antennas 14 and 15 include plural spiral shaped or helical-shaped coils 143 and 153 which are connected in cascade, the coils having diameters smaller than the outer diameters of the antennas and having loop surfaces directed onto the same plane, a power transmission can be implemented even in a case in which a metallic member (a shaft 51) exists in the surroundings of the power transmission device. Further, because the space between the metallic member and the transmission/reception unit 12 can be made to be narrower than that in conventional structures, the device can be downsized.

Embodiment 6

In Embodiment 5, the case in which the transmission/reception unit 12 is disposed for the shaft 51 which is a metallic member is shown. In contrast to this, in Embodiment 6, a case in which a transmission/reception unit 12 is arranged inside a housing 52 including a metallic member will be shown. The entire structure of a power transmission device 1 is the same as that shown in FIG. 1, and the explanation of the structure will be omitted hereafter.

Figure 28A:
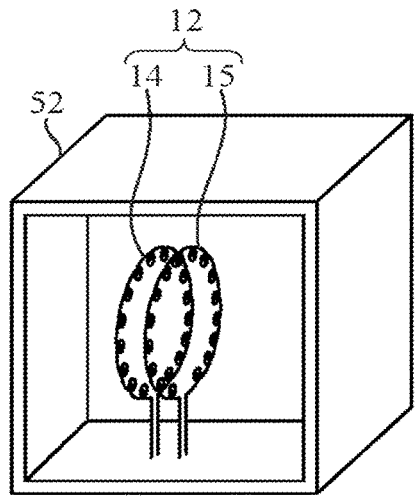
FIGS. 28A and 28B are schematic views showing exemplary structures of a transmission/reception unit of Embodiment 6 of the present invention.

FIG. 28A shows a case in which the transmission/reception unit 12 is arranged inside the metallic housing 52 whose front face is open. It is assumed that the shape of a transmitting antenna 14 and receiving antenna 15 is the same as that shown in FIG. 25B.

In this case, with the antenna shape of the present invention, a magnetic field having a high magnetic flux density occurs in each of small coils 143 and 153 which is wound in a spiral or helical form, and, by using this magnetic field having a high magnetic flux density, the transmission of power from the transmitting antenna 14 to the receiving antenna 15 is carried out, like in the case of Embodiment 5. On the other hand, because the sizes of the coils 143 and 153 are sufficiently smaller than those of the transmitting and receiving antennas 14 and 15, no magnetic field having a high magnetic flux density spreads out over the surroundings of the antennas, while only a magnetic field having a low magnetic flux density reaches the metallic member (the housing 52) existing in the surroundings of the antennas. Therefore, the influence (an eddy current and so on) of this housing 52 can be reduced, and a power transmission with high energy efficiency can be carried out.

From the above, even if the housing 52 is a metallic member, the transmission of power between the transmitting and receiving antennas 14 and 15 can be carried out. By arranging the transmission/reception unit 12 apart, at a distance of the radius of one having a minimum size of the coils 143 and 153, or more from the metallic member (the housing 52), the power transmission efficiency is maximized.

Figure 28B:
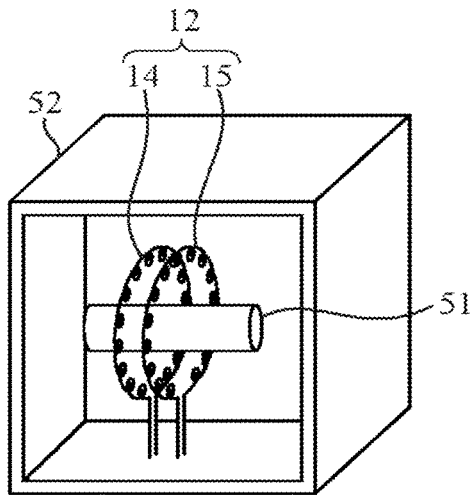

FIG. 28B shows a case in which the transmission/reception unit 12 having a metallic shaft 51 on a central axis is arranged inside a metallic housing 52 whose front face is open.

Also in this case, with the antenna shape of the present invention, a magnetic field having a high magnetic flux density occurs in each of small coils 143 and 153 which is wound in a spiral or helical form, and, by using this magnetic field having a high magnetic flux density, the transmission of power from the transmitting antenna 14 to the receiving antenna 15 is carried out, like in the case of Embodiment 5. On the other hand, because the sizes of the coils 143 and 153 are sufficiently smaller than those of the transmitting and receiving antennas 14 and 15, no magnetic field having a high magnetic flux density spreads out over the surroundings of the antennas, while only a magnetic field having a low magnetic flux density reaches the metallic members (the shaft 51 and the housing 52) existing in the surroundings of the antennas. Therefore, the influence (an eddy current loss and so on) of these shaft 51 and housing 52 can be reduced, and a power transmission with high energy efficiency can be carried out.

From the above, even if the shaft 51 and the housing 52 are metallic members, the transmission of power between the transmitting and receiving antennas 14 and 15 can be carried out. In the case of FIG. 28B, the transmission/reception unit 12 needs to be arranged apart, at a distance of one-tenth or more of the inner diameter of a minimum-sized antenna of the transmitting and receiving antennas 14 and 15, from each of the metallic members (the shaft 51 and the housing 52).

FIGS. 28A and 28B show the cases in which the transmission/reception unit 12 is arranged inside the metallic housing 52 whose front face is open. Nonetheless, the present embodiment is not limited to these cases. It is similar to the above-mentioned things also in a case in which the transmission/reception unit 12 is arranged inside a housing 52 which are wholly covered by metallic members, as well as in a case in which the transmission/reception unit 12 is arranged inside a housing 52 which in part includes a metallic member.

Further, although in FIGS. 28A and 28B the cases in which the transmission/reception unit 12 is arranged inside the metallic housing 52 are shown, the transmission/reception unit 12 is constructed in the above-mentioned way also in a case in which another metallic peripheral member exists in the surroundings of the transmission/reception unit 12.

Further, shielding members 53 can be arranged between the transmission/reception unit 12 and metallic members, like in the case of Embodiment 3. By using the shielding members 53 in this way, leakage of a magnetic field from the transmission/reception unit 12 to the metallic members can be further reduced, and the power transmission efficiency can be further increased.

Further, each shielding member 53 can consist of two magnetic sheets 531 and a conductor 532 containing free electrons and arranged between the two magnetic sheets 531, similarly to FIG. 21 in Embodiment 3. As a result, leakage of a magnetic field from the transmission/reception unit 12 to the metallic members can be prevented. Further, although in FIG. 21 the case in which the magnetic sheets 531 are disposed on both side surfaces of the conductor 532 is shown, a magnetic sheet 531 can be disposed only on one of the side surfaces.

Further, the power transmission device 1 according to Embodiment 6 can be applied to, for example, the structures shown in FIGS. 17 and 18.

As mentioned above, according to this Embodiment 6, because the transmission/reception unit 12 having the transmitting antenna 14 and the receiving antenna 15 that carries out a wireless power transmission in cooperation with the transmitting antenna 14 is provided, and the transmitting and receiving antennas 14 and 15 include plural spiral-shaped or helical-shaped coils 143 and 153 which are connected in cascade, the coils having diameters smaller than the outer diameters of the antennas and having loop surfaces directed onto the same plane, a power transmission can be carried out even in a case in which a metallic member (a housing 52 or another peripheral member) exists in the surroundings of the power transmission device. Further, because the space between the metallic member and the transmission/reception unit 12 can be made to be narrower than that in conventional structures, the device can be downsized.

Embodiment 7

In Embodiments 5 and 6, the case in which a single transmission/reception unit 12 is disposed is shown. In contrast to this, in Embodiment 7, a case in which plural transmission/reception units 12 are disposed will be shown. In figures, a case in which three transmission/reception units 12 are disposed is shown, and the suffixes "a" to "c" are added to reference numerals denoting functional units.

Figure 29A:
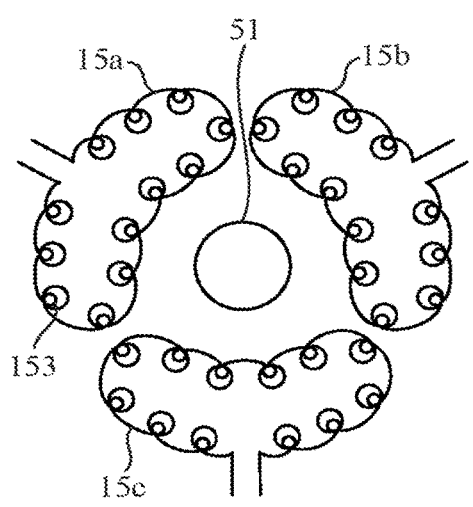
FIGS. 29A and 29B are schematic views showing an exemplary structure of a transmission/reception unit of Embodiment 7 of the present invention.
Figure 29B:
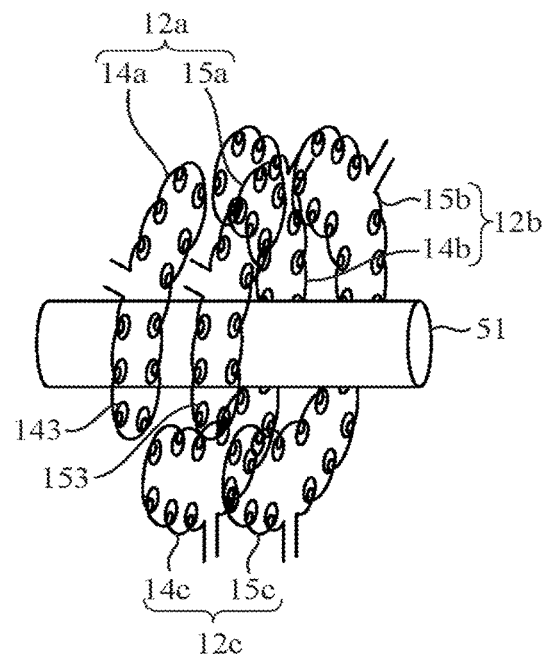

In an example shown in FIGS. 29A and 29B, plural transmitting antennas 14 are disposed in the same plane and around a central axis, plural receiving antennas 15 are disposed in the same plane and around the central axis, and each of pairs of transmitting antennas 14 and receiving antennas 15 is arranged opposite to each other along the direction of the central axis.

In a case in which a shaft 51 is a non-rotatable body, by arranging the plural transmitting antennas 14 and the plural receiving antennas 15 in such a way that the transmitting and receiving antennas are opposite to each other in one to one correspondence, as shown in FIGS. 29A and 29B, a power transmission in each pair can be independently implemented.

In contrast, in a case in which the shaft 51 is a rotatable body and multiple power transmissions are carried out via this rotatable body, the transmitting antennas 14 and the receiving antennas 15 rotate independently. For example, in a state in which a power transmission from a transmitting antenna 14a to a receiving antenna 15a is being carried out, as shown in FIGS. 29A and 29B, when either the transmit side or the receive side rotates by 120 degrees, the transmitting antenna 14a is placed opposite to another receiving antenna (15b or 15c). A control unit that changes the pairs of transmitting antennas 14 and receiving antennas 15 with the above-mentioned rotation is disposed in either the transmit side or the receive side. As a result, even in the case in which multiple power transmissions are carried out via the rotatable body, a power transmission in each pair can be independently implemented.

In the state shown in FIGS. 29A and 29B, when, for example, either the transmit side or the receive side rotates by 60 degrees, two receiving antennas 15 are placed opposite to each transmitting antenna 14 with the same degree of overlap, and the pairs cannot be changed. To solve this problem, for example, a control operation of switching off the power transmission in every pair can be carried out for a range between +10 degrees and −10 degrees which produces such a state.

Further, when it is not necessary to independently implement a power transmission in each pair, the above-mentioned change of the pairs is unnecessary.

Figure 30A:
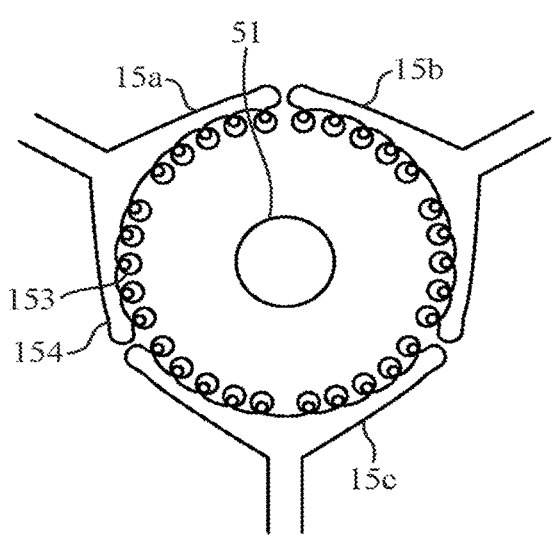
FIGS. 30A and 30B are schematic views showing another exemplary structure of the transmission/reception unit of Embodiment 7 of the present invention.
Figure 30B:
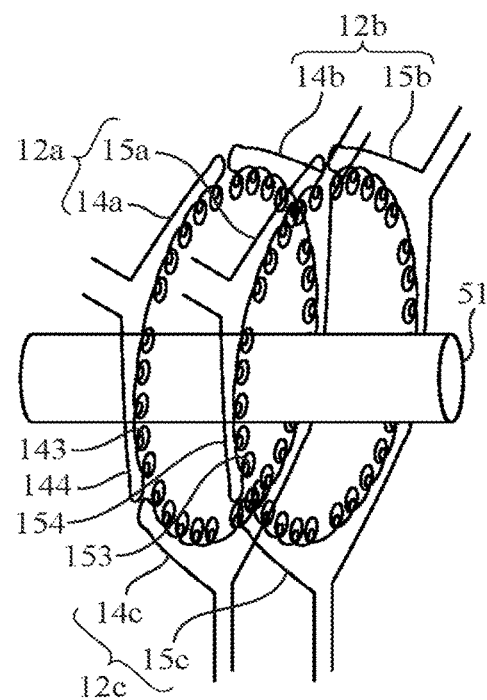

Further, FIGS. 30A and 30B show antennas whose shapes are changed from those in the structure shown in FIGS. 29A and 29B. More specifically, in the antennas shown in FIGS. 30A and 30B, coils 143 and 153 are disposed in portions of antenna loops (portions opposite to a shaft 51). Even in the case of this antenna shape, a power transmission can be carried out in the above-mentioned way. More specifically, a power transmission is carried out because a magnetic field having a high magnetic flux density occurs in each of the coils 143 and 153 in which plural turns are wound in a spiral or helical form, while no magnetic field having a high magnetic flux density occurs in each of straight portions 144 and 154 of the antenna loops.

Figure 31B:
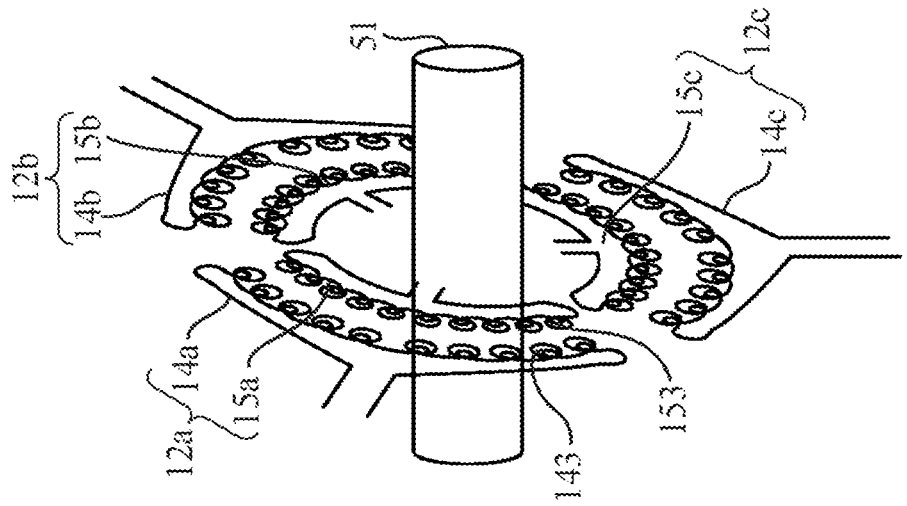
FIGS. 31A and 31B are schematic views showing another exemplary structure of the transmission/reception unit of Embodiment 7 of the present invention.
Figure 31A:
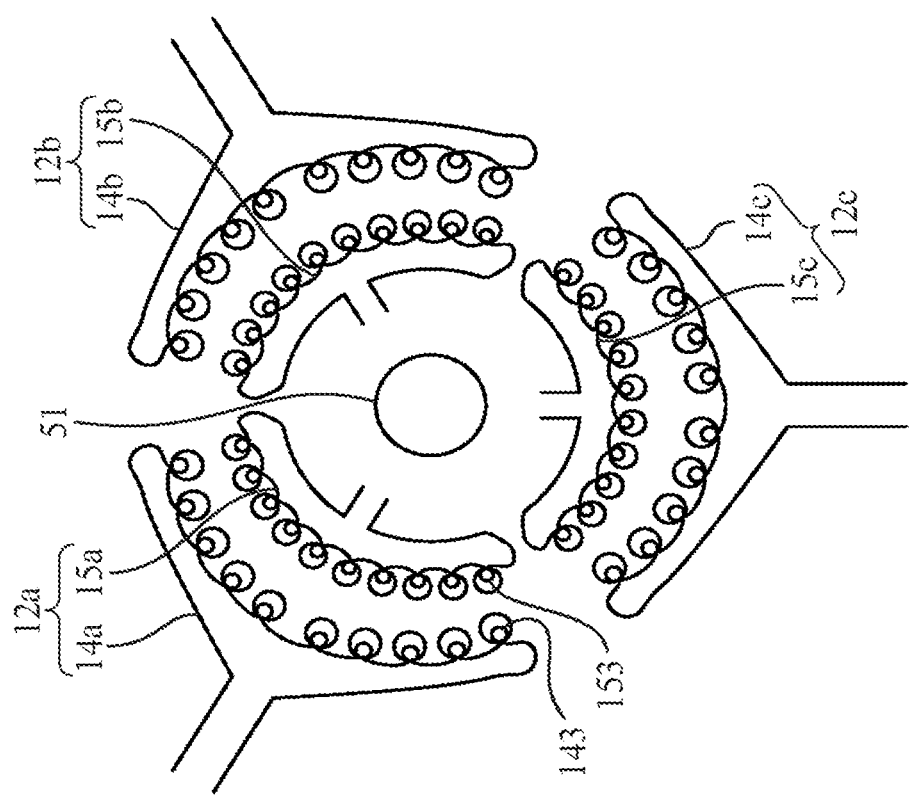

Further, in an example shown in FIGS. 31A and 31B, plural transmitting antennas 14 are disposed in the same plane and around a central axis, plural receiving antennas 15 are disposed in the same plane and around the central axis, and each of pairs of transmitting antennas 14 and receiving antennas 15 is arranged in a fitted manner. Even in this antenna arrangement, multiple power transmissions can be carried out, like in the case of the structure shown in FIGS. 29A and 29B.

Although in FIGS. 31A and 31B the case in which the receiving antennas 15 are arranged inside the transmitting antennas 14 is shown, conversely, the transmitting antennas 14 can be arranged inside the receiving antennas 15.

Embodiment 8

Figure 32:
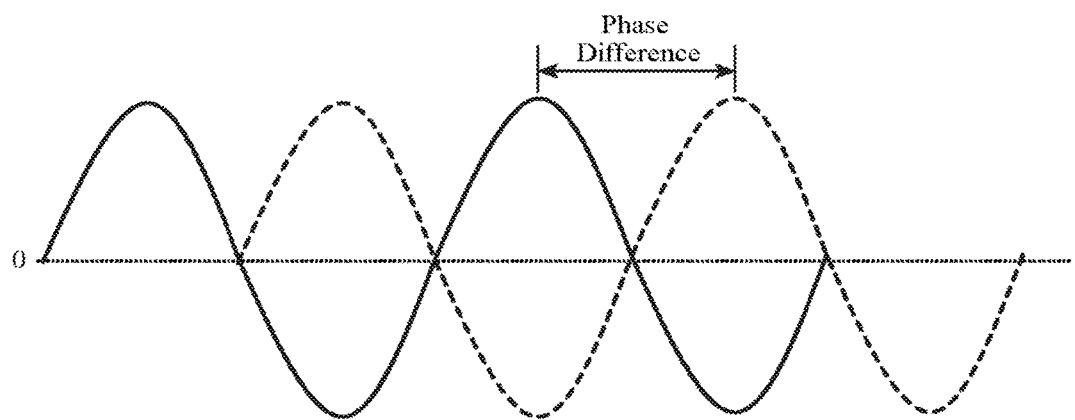
FIG. 32 is a diagram explaining an exemplary operation of a power transmission device according to Embodiment 8 of the present invention.

In Embodiments 1 to 7, the structures are shown, which make it possible for the antennas to be arranged close to a metallic member by improvement to the antenna shape. In addition to these structures, as shown in FIG. 32, a difference in magnetic phase between transmission/reception units 12 is provided, thereby reducing the mutual interference between the transmission reception units. In FIG. 32, a solid line indicates the magnetic phases of two outermost transmission/reception units 12a and 12c among the three transmission/reception units 12 shown in FIG. 24, and a broken line indicates the magnetic phase of a middle transmission/reception unit 12b, and a case in which the magnetic phases of the two outermost transmission/reception units and the magnetic phase of the middle transmission/reception unit are 180 degrees out of phase with each other is shown.

In Embodiments 1 to 8, the cases in which each of the transmitting and receiving antennas 14 and 15 consists of a single coil is shown. Nonetheless, the embodiments are not limited to those cases, and each coil can includes a coil for power supply and a coil for resonance or includes two or more coils.

In addition, an arbitrary combination of two or more of the embodiments can be made, various changes can be made in an arbitrary component of any one of the embodiments, and an arbitrary component of any one of the embodiments can be omitted within the scope of the invention.

INDUSTRIAL APPLICABILITY

The power transmission device 1 according to the present invention is suitable for use as a power transmission device and so on that can carry out a power transmission even in a case in which a metallic member exists in the surroundings of the power transmission device, and that carry out a wireless power transmission.

REFERENCE SIGNS LIST

1: power transmission device; 11: transmission power supply; 12: transmission/reception unit; 13: rectifier circuit; 14: transmitting antenna; 15: receiving antenna; 51: axis; 52: housing; 53: shielding member; 61: vehicle (moving object); 62: robot arm; 63: monitoring camera; 64: vehicle (moving object); 65: road (fixed surface); 66: vehicle (moving object); 67: radar device; 68: lighthouse; 69: fan; 70: vehicle; 71: battery-assisted bicycle; 72: bicycle parking stand; 73: vehicle (moving object); 74: vehicle (moving object); 75: road (fixed surface); 76: linear motor car (moving object); 77: road surface (fixed surface); 141, 151: gap; 142, 152: lead portion; 143, 153: coil; 144, 154: straight portion; 531: magnetic sheet; 532: conductor; 611: shaft; 612: main body; 613: tire; 614: sensor; 615: antenna arrangement portion; 621: rotary part; 622: antenna arrangement portion; 631: camera main body; 632: antenna arrangement portion; 641: tire; 642: wheel cap; 643: wheel; 661: in-wheel motor; 662: tire; 663: shaft; 671: radar main body; 672: antenna arrangement portion; 681: shading wall; 682: antenna arrangement portion; 691: blade; 692: antenna arrangement portion; 701: steering wheel; 702: steering shaft; 711: spoke; 712: shaft; 731: engine room; 732: equipment; 733: sensor; 734: antenna arrangement portion; and 741: tire.

The invention claimed is:

1. A power transmission device comprising one or more transmission/reception units each of which includes a transmitting antenna and a receiving antenna for carrying out a wireless power transmission in cooperation with the transmitting antenna, wherein
   the transmitting and receiving antennas include a first coil and a second coil, respectively;
   each of the first and second coils has a first arc-shaped portion through which a current flows in a direction, and has a second arc-shaped portion through which a current flows in an opposite direction; and
   the first arc-shaped portion extends along the second arc-shaped portion.

2. The power transmission device according to claim 1, wherein the transmission/reception unit is arranged apart, at a distance of one-tenth or more of an inner diameter of a minimum-sized antenna of the transmitting and receiving antennas, from a metallic member.

3. The power transmission device according to claim 1, further comprising a shielding member arranged between the transmission/reception unit and a metallic member.

4. The power transmission device according to claim 3, wherein the shielding member is a magnetic sheet or a metallic loop.

5. The power transmission device according to claim 3, wherein the shielding member has a magnetic sheet and a conductor containing free electrons and being opposite to the magnetic sheet.

6. The power transmission device according to claim 1, wherein a plurality of the transmission/reception units is disposed.

7. The power transmission device according to claim 1, wherein the transmission/reception unit carries out a wireless power transmission by using magnetic-field resonance, electric-field resonance, or electromagnetic induction.

8. The power transmission device according to claim 6, wherein a difference in magnetic phase is formed between the adjacent transmission/reception units.

9. The power transmission device according to claim 1, wherein each of the transmitting and receiving antennas includes two or more coils.

10. The power transmission device according to claim 1, wherein the receiving antenna is disposed in a moving object, and the transmitting antenna is disposed in a fixed surface which is opposite to the moving object while the moving object is traveling or when the moving object is standing.

11. The power transmission device according to claim 1, wherein the first arc-shaped portion is arranged parallel to the second arc-shaped section, and the first and second portions are disposed in a same plane.

12. The power transmission device according to claim 1, wherein the first arc-shaped portion is arranged about an axis at a first radial distance from the axis, and the second arc-shaped portion is arranged about the axis at a second radial distance from the axis less than the first radial distance.

13. The power transmission device according to claim 1, wherein:
- each of the first and second coils has a C-shape;
- the first arc-shaped portion is arranged along an outer curved portion of the C-shape; and
- the second arc-shaped portion is arranged along an inner curved portion of the C-shape.

14. The power transmission device according to claim 1, wherein:
- the first arc-shaped portion has two ends between which a gap exists, and has a lead portion for connection to a feed terminal;
- the second arc-shaped portion has both ends connected to the two ends of the first arc-shaped portion, respectively; and
- the first arc-shaped portion has a first radius of curvature greater than a second radius of curvature of the second arc-shaped portion.

15. The power transmission device according to claim 1, wherein the first and second coils are arranged on a same plane, and the second coil is disposed on an inner side of the first coil.

* * * * *